(12) United States Patent
Lim et al.

(10) Patent No.: US 9,535,514 B2
(45) Date of Patent: Jan. 3, 2017

(54) TACTILE FEEDBACK APPARATUSES AND METHODS FOR PROVIDING SENSATIONS OF WRITING

(71) Applicant: Samsung Electronics Co., Ltd., Suwon-Si, Gyeonggi-Do (KR)

(72) Inventors: Soochul Lim, Seoul (KR); Joonah Park, Seoul (KR)

(73) Assignee: Samsung Electronics Co., Ltd., Gyeonggi-do (KR)

( * ) Notice: Subject to any disclaimer, the term of this patent is extended or adjusted under 35 U.S.C. 154(b) by 38 days.

(21) Appl. No.: 14/584,264

(22) Filed: Dec. 29, 2014

(65) Prior Publication Data

US 2015/0323995 A1 Nov. 12, 2015

(30) Foreign Application Priority Data

May 9, 2014 (KR) ........................ 10-2014-0055748

(51) Int. Cl.
*G06F 3/045* (2006.01)
*G06F 3/0354* (2013.01)
*G06F 3/041* (2006.01)
*G06F 3/044* (2006.01)
*G06F 3/01* (2006.01)

(52) U.S. Cl.
CPC ............ *G06F 3/03545* (2013.01); *G06F 3/016* (2013.01); *G06F 3/044* (2013.01); *G06F 3/0414* (2013.01); *G06F 3/0416* (2013.01); *G06F 2203/014* (2013.01); *G06F 2203/04105* (2013.01); *G06F 2203/04106* (2013.01)

(58) Field of Classification Search
CPC .. G06F 3/016; G06F 3/03545; G06F 3/03547; G06F 3/0414; G06F 2203/0384; G06F 2203/04104; G06F 2203/04106; G08B 6/00; G05G 2009/04766
See application file for complete search history.

(56) References Cited

U.S. PATENT DOCUMENTS

| 8,059,088 B2* | 11/2011 | Eid | G06F 3/016 345/156 |
| 8,520,866 B2 | 8/2013 | Linjama | |
| 8,570,163 B2 | 10/2013 | Makinen et al. | |
| 2009/0174671 A1* | 7/2009 | Tachi | G06F 3/016 345/173 |
| 2010/0231540 A1* | 9/2010 | Cruz-Hernandez | G06F 3/0488 345/173 |

(Continued)

FOREIGN PATENT DOCUMENTS

| JP | 2013122750 A | 6/2013 |
| KR | 20100065816 A | 6/2010 |
| KR | 20130109027 A | 10/2013 |

*Primary Examiner* — Joe H Cheng
(74) *Attorney, Agent, or Firm* — Harness, Dickey & Pierce, P.L.C.

(57) ABSTRACT

A tactile feedback apparatus may include: a touch display configured to display objects; a tactile information extractor configured to extract tactile information corresponding to an object touched by a touch input tool; a tactile information changing unit configured to change the tactile information based on sensing information of the touch input tool; and/or a tactile feedback provider configured to provide the touch input tool with tactile feedback based on the tactile information.

20 Claims, 25 Drawing Sheets

(56) References Cited

U.S. PATENT DOCUMENTS

| | | | |
|---|---|---|---|
| 2010/0267424 A1* | 10/2010 | Kim | G06F 3/016 455/566 |
| 2011/0109588 A1 | 5/2011 | Makinen et al. | |
| 2011/0267294 A1* | 11/2011 | Kildal | G06F 3/0414 345/173 |
| 2011/0285637 A1* | 11/2011 | Karkkainen | G06F 3/016 345/173 |
| 2012/0127088 A1* | 5/2012 | Pance | G06F 3/016 345/173 |
| 2012/0194466 A1* | 8/2012 | Posamentier | G06F 3/041 345/174 |
| 2012/0268412 A1* | 10/2012 | Cruz-Hernandez | G06F 3/0488 345/174 |
| 2012/0327006 A1* | 12/2012 | Israr | G06F 3/044 345/173 |
| 2013/0106758 A1 | 5/2013 | Radivojevic et al. | |
| 2013/0234972 A1* | 9/2013 | Bogsanyi | A63F 3/00075 345/173 |
| 2013/0307829 A1* | 11/2013 | Libin | G06F 3/016 345/179 |
| 2014/0055377 A1* | 2/2014 | Kim | G06F 3/0418 345/173 |
| 2014/0071117 A1* | 3/2014 | Schuckle | G06F 3/016 345/419 |
| 2014/0089791 A1* | 3/2014 | Ishimaru | G06F 3/0416 715/702 |
| 2014/0145970 A1* | 5/2014 | Cho | G06F 3/016 345/173 |
| 2014/0240110 A1* | 8/2014 | Suzuki | G06F 3/041 340/407.1 |
| 2014/0267065 A1* | 9/2014 | Levesque | G06F 3/016 345/173 |
| 2015/0067495 A1* | 3/2015 | Bernstein | G06F 3/016 715/702 |
| 2015/0067497 A1* | 3/2015 | Cieplinski | G06F 3/016 715/702 |
| 2015/0169056 A1* | 6/2015 | Weddle | G06F 3/0414 345/173 |
| 2015/0185848 A1* | 7/2015 | Levesque | G06F 3/016 345/173 |
| 2015/0293592 A1* | 10/2015 | Cheong | G06F 3/016 345/173 |

* cited by examiner

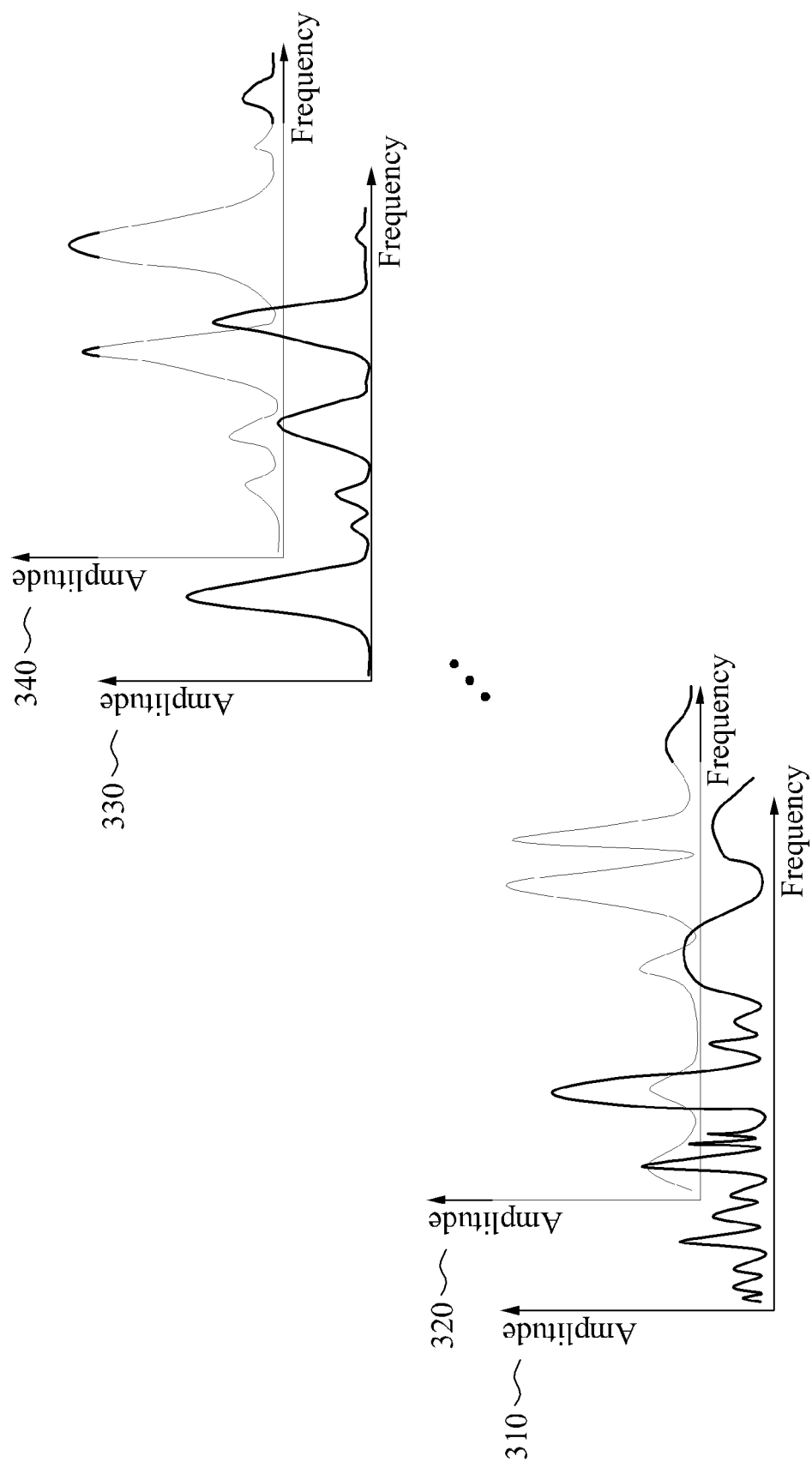

TACTILE FEEDBACK APPARATUSES AND METHODS FOR PROVIDING SENSATIONS OF WRITING

CROSS-REFERENCE TO RELATED APPLICATION(S)

This application claims priority from Korean Patent Application No. 10-2014-0055748, filed on May 9, 2014, in the Korean Intellectual Property Office (KIPO), the entire contents of which are incorporated herein by reference.

BACKGROUND

1. Field

Some example embodiments may relate generally to tactile feedback apparatuses. Some example embodiments may relate generally to methods for providing sensations of writing based on writing instruments.

2. Description of Related Art

Touch-display technology may enable input of commands corresponding to objects displayed on displays by touching the objects, or input of pictures or letters based on moving routes by moving a user's finger in contact with the displays, without separate input devices, for example, keyboards. For example, hands or touch pens may be used to perform inputs to touch displays.

However, because surfaces of touch displays may be formed of tempered glass that is more slippery than materials used for typical writing instruments, for example, paper, when hands of users or touch pens in contact with the touch displays are moved, users may feel as if the hands or the touch pens slip on the touch displays. For example, when users write or draw on the touch displays with pens or fingers of the users, the users may experience sensations of writing that are different from writing or drawing on paper.

Accordingly, there may be a desire for methods of providing sensations of writing similar to writing or drawing on paper when users write or draw on touch displays with hands or touch pens.

SUMMARY

In some example embodiments, a tactile feedback apparatus may comprise: a touch display configured to display objects; a tactile information extractor configured to extract tactile information corresponding to an object touched by a touch input tool; a tactile information changing unit configured to change the tactile information based on sensing information of the touch input tool; and/or a tactile feedback provider configured to provide the touch input tool with tactile feedback based on the tactile information.

In some example embodiments, the tactile information extractor may be configured to extract the tactile information based on a type of the touch input tool and a texture of the object.

In some example embodiments, when the touch input tool is a pen, the tactile information changing unit may be configured to change an amplitude of the tactile information based on the texture of the object, and may be configured to provide a user with a sensation of writing on the object using the pen.

In some example embodiments, the tactile information extractor may be configured to extract the tactile information based on a texture of the object and a type of an input mode in which an input by the touch input tool is recognized in a form of a pen or a brush with a desired thickness.

In some example embodiments, the tactile information changing unit may be configured to change an amplitude of the tactile information based on the texture of the object and the type of the input mode, and may be configured to provide a user with a sensation of writing on the object, using the pen or the brush with the desired thickness, in the input mode.

In some example embodiments, the sensing information may comprise at least one of a position of the touch input tool, an area of the touch input tool, a moving speed of the touch input tool, or a pressure applied to the object by the touch input tool.

In some example embodiments, the tactile information changing unit may be configured to change an amplitude of the tactile information based on the area of the touch input tool.

In some example embodiments, the tactile information changing unit may be configured to change a frequency of the tactile information based on the moving speed of the touch input tool.

In some example embodiments, the tactile information changing unit may be configured to change an amplitude of the tactile information based on the pressure.

In some example embodiments, the touch input tool may be a user's finger or a pen configured to enable a touch input.

In some example embodiments, a tactile feedback apparatus may comprise: a touch display configured to display objects; a tactile information extractor configured to extract tactile information corresponding to an object touched by a touch input tool comprising an electrode; a tactile information changing unit configured to change the tactile information based on sensing information of the touch input tool; a tactile information transmitter configured to transmit the tactile information to the touch input tool; and/or a tactile feedback provider configured to provide the touch input tool with tactile feedback based on the tactile information, by generating electrostatic force based on a voltage difference between a ground region and the electrode, the ground region being included in the tactile feedback provider, and the electrode configured to operate based on the tactile information.

In some example embodiments, the touch input tool may be configured to operate the electrode using a tactile signal corresponding to the tactile information, and is configured to apply an electric charge to the object.

In some example embodiments, the tactile information extractor may be configured to extract the tactile information based on a type of the touch input tool and a texture of the object.

In some example embodiments, the tactile information changing unit may be configured to change an amplitude of the tactile information based on the texture of the object, and is configured to provide a user holding the touch input tool with a sensation of writing on the object using a pen.

In some example embodiments, the tactile information extractor may be configured extract the tactile information based on a texture of the object and a type of an input mode in which an input by the touch input tool is recognized in a form of a pen or a brush with a desired thickness.

In some example embodiments, the tactile information changing unit may be configured to change an amplitude of the tactile information based on the texture of the object and the type of the input mode, and may be configured to provide a user holding the touch input tool with a sensation of writing on the object, using the pen or the brush with the desired thickness, in the input mode.

In some example embodiments, the sensing information may comprise at least one of a position of the touch input tool, an area of the touch input tool, a moving speed of the touch input tool, or a pressure applied to the object by the touch input tool.

In some example embodiments, the tactile information changing unit may be configured to change an amplitude of the tactile information based on the area of the touch input tool.

In some example embodiments, the tactile information changing unit may be configured to change a frequency of the tactile information based on the moving speed of the touch input tool.

In some example embodiments, a tactile feedback method may comprise: extracting tactile information corresponding to an object touched by a touch input tool; changing the tactile information based on sensing information of the touch input tool; and/or providing the touch input tool with tactile feedback based on the tactile information.

BRIEF DESCRIPTION OF THE DRAWINGS

The above and/or other aspects and advantages will become more apparent and more readily appreciated from the following detailed description of example embodiments, taken in conjunction with the accompanying drawings, in which:

FIG. 3 illustrates an example of tactile information according to some example embodiments;

DETAILED DESCRIPTION

Figure 1:
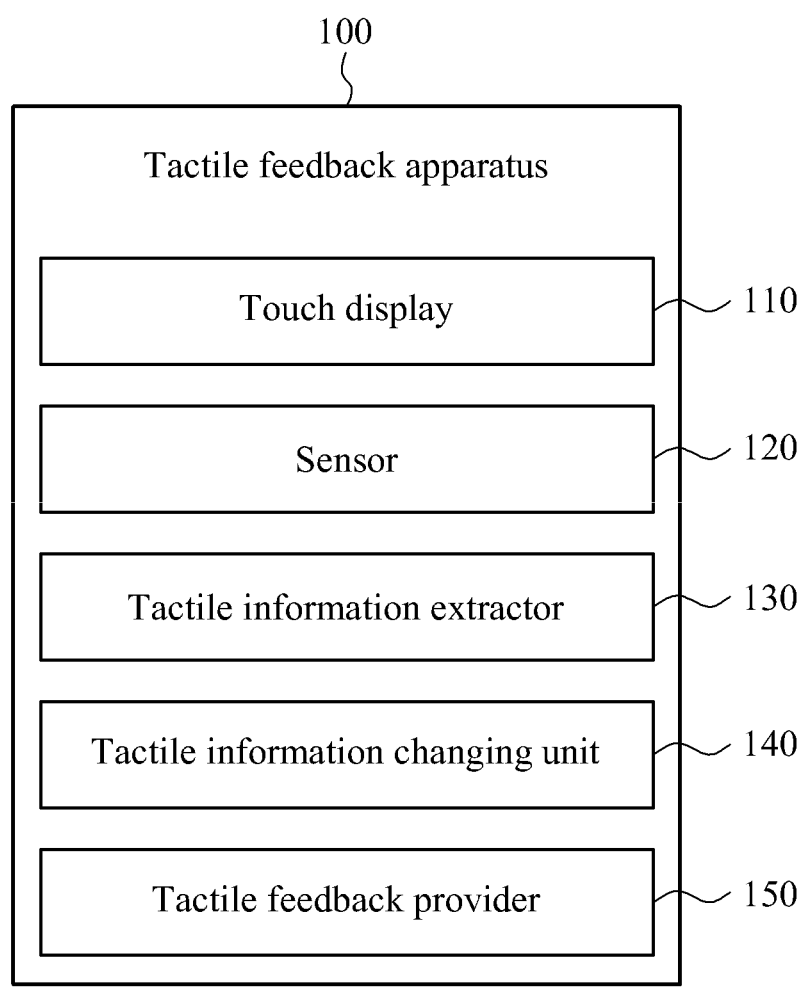
FIG. 1 is a block diagram illustrating an example of a structure of a tactile feedback apparatus according to some example embodiments.

Example embodiments will now be described more fully with reference to the accompanying drawings. Embodiments, however, may be embodied in many different forms and should not be construed as being limited to the embodiments set forth herein. Rather, these example embodiments are provided so that this disclosure will be thorough and complete, and will fully convey the scope to those skilled in the art. In the drawings, the thicknesses of layers and regions may be exaggerated for clarity.

It will be understood that when an element is referred to as being "on," "connected to," "electrically connected to," or "coupled to" to another component, it may be directly on, connected to, electrically connected to, or coupled to the other component or intervening components may be present. In contrast, when a component is referred to as being "directly on," "directly connected to," "directly electrically connected to," or "directly coupled to" another component, there are no intervening components present. As used herein, the term "and/or" includes any and all combinations of one or more of the associated listed items.

It will be understood that although the terms first, second, third, etc., may be used herein to describe various elements, components, regions, layers, and/or sections, these elements, components, regions, layers, and/or sections should not be limited by these terms. These terms are only used to distinguish one element, component, region, layer, and/or section from another element, component, region, layer, and/or section. For example, a first element, component, region, layer, and/or section could be termed a second element, component, region, layer, and/or section without departing from the teachings of example embodiments.

Spatially relative terms, such as "beneath," "below," "lower," "above," "upper," and the like may be used herein for ease of description to describe the relationship of one component and/or feature to another component and/or feature, or other component(s) and/or feature(s), as illustrated in the drawings. It will be understood that the spatially relative terms are intended to encompass different orientations of the device in use or operation in addition to the orientation depicted in the figures.

The terminology used herein is for the purpose of describing particular example embodiments only and is not intended to be limiting of example embodiments. As used herein, the singular forms "a," "an," and "the" are intended to include the plural forms as well, unless the context clearly indicates otherwise. It will be further understood that the terms "comprises," "comprising," "includes," and/or "including," when used in this specification, specify the presence of stated features, integers, steps, operations, elements, and/or components, but do not preclude the presence or addition of one or more other features, integers, steps, operations, elements, components, and/or groups thereof.

Unless otherwise defined, all terms (including technical and scientific terms) used herein have the same meaning as commonly understood by one of ordinary skill in the art to which example embodiments belong. It will be further understood that terms, such as those defined in commonly used dictionaries, should be interpreted as having a meaning that is consistent with their meaning in the context of the relevant art and should not be interpreted in an idealized or overly formal sense unless expressly so defined herein.

Reference will now be made to example embodiments, which are illustrated in the accompanying drawings, wherein like reference numerals may refer to like components throughout.

FIG. 1 is a block diagram illustrating a structure of a tactile feedback apparatus 100 according to some example embodiments.

Referring to FIG. 1, the tactile feedback apparatus 100 may include a touch display 110, a sensor 120, a tactile information extractor 130, a tactile information changing unit 140, and a tactile feedback provider 150.

The touch display 110 may display an object that is to be touched by a touch input tool. For example, the touch display 110 may display an object enabling writing, for example, paper, on a whole screen or a part of the screen.

The sensor 120 may sense a touch input tool used to touch an object displayed by the touch display 110, and may generate sensing information. For example, the sensor 120 may sense at least one of a position of the touch input tool, an area of the touch input tool, a moving speed of the touch input tool, or pressure applied to the object by the touch input tool, and may generate sensing information based on a result of the sensing. In other words, the sensing information may include at least one of the position, the area, the moving speed, or the pressure. The pressure may be, for example, pressure applied by the touch input tool to the tactile feedback provider 150 bonded onto the touch display 110.

The touch input tool may be, for example, one of a user's finger, a touch pen, and an input device enabling the sensor 120 to sense a touch. Additionally, the sensor 120 may generate sensing information based on a type of touch input tools. In some example embodiments, when a tool with a changeable touch area, for example a user's finger, is used as a touch input tool, the sensor 120 may sense a position of the tool, may measure an area of the tool in the sensed position, and may generate sensing information. In some example embodiments, when a tool with a fixed touch area, for example a pen, is used as a touch input tool, the sensor 120 may sense a position of the tool and may generate sensing information.

The tactile information extractor 130 may identify an object touched by the touch input tool based on the sensing information generated by the sensor 120, and may extract tactile information corresponding to the identified object. The tactile information extractor 130 may include a database. The database may store tactile information for each of textures of objects, based on types of touch input tools or types of input modes selected in software. For example, the database may store tactile information extracted when paper and pen are used as an object and a touch input tool, independently of tactile information extracted when paper and a finger are used as an object and a touch input tool. Additionally, when a texture is determined based on a type of paper, the database may store different tactile information based on the type of paper. The input mode may be a mode in which a terminal including the touch display 110 recognizes an input by the touch input tool in a form of a pen or a brush with a desired thickness (that may or may not be predetermined). For example, when the input mode corresponds to a brush, the terminal may recognize an input corresponding to movement of the touch input tool as drawing with a brush. Additionally, the input mode may be selected independently of hardware of the touch input tool. For example, the input mode may correspond to a brush even when a pen or a finger is used as a touch input tool. The tactile information may include at least one of a frequency, a direct current (DC) offset, an amplitude, or a voltage duration.

The tactile information extractor 130 may identify an object touched by the touch input tool based on the position of the touch input tool in the sensing information. Additionally, the tactile information extractor 130 may identify the type of the touch input tool based on the area of the touch input tool. In addition, the tactile information extractor 130 may receive an input of an input mode selected by a user. The tactile information extractor 130 may extract, from the database, tactile information corresponding to at least one of the type of the touch input tool, the input mode, or a texture of an object. For example, the touch input tool, a software input device, and an object may be a pen, a brush, and paper, respectively. In some example embodiments, a terminal including the touch display 110 may display an image or a line seemingly drawn with a brush in the position of the touch input tool. Additionally, the tactile information extractor 130 may search for at least one tactile information corresponding to the brush from tactile information corresponding to a texture of paper, and may extract, from the found tactile information, tactile information to provide a user with a sensation of writing or drawing on paper with a brush, through the pen.

The tactile information changing unit 140 may change tactile information based on sensing information of a touch input tool used to touch an object. For example, the tactile information changing unit 140 may change the tactile information based on at least one of an area of the touch input tool, a moving speed of the touch input tool, or pressure applied to the object by the touch input tool.

Because electrostatic force is proportional to contact area, tactile feedback based on the electrostatic force may also be proportional to the contact area. Accordingly, the tactile information changing unit 140 may change the tactile information based on the area of the touch input tool. In some example embodiments, when the area of the touch input tool is increased, the tactile information changing unit 140 may reduce an amplitude of the tactile information. In some example embodiments, when the area of the touch input tool is reduced, the tactile information changing unit 140 may increase the amplitude of the tactile information.

When the moving speed of the touch input tool is increased, an electrostatic force required to provide the same tactile feedback to the touch input tool may be increased. Accordingly, the tactile information changing unit 140 may change the tactile information based on the moving speed of the touch input tool. In some example embodiments, when the moving speed of the touch input tool is increased, the tactile information changing unit 140 may shift a frequency of the tactile information to be increased. In some example embodiments, when the moving speed of the touch input tool is reduced, the tactile information changing unit 140 may shift the frequency of the tactile information to be reduced.

Additionally, when the pressure applied to the object by the touch input tool is increased, an electrostatic force required to provide the same tactile feedback to the touch input tool may be increased. Accordingly, the tactile information changing unit 140 may change the tactile information based on the pressure. In some example embodiments, when the pressure is increased, the tactile information changing unit 140 may increase the amplitude of the tactile information. In some example embodiments, when the pressure is reduced, the tactile information changing unit 140 may reduce the amplitude of the tactile information.

The tactile feedback provider 150 may provide tactile feedback based on the tactile information to the touch input tool.

The tactile feedback provider 150 may generate a tactile signal based on the tactile information, and may transfer the tactile signal to an electrode. The electrode may apply an electric charge to a dielectric layer based on the tactile signal, and may enable an electrostatic force to be generated. The generated electrostatic force may be used to provide tactile feedback to the touch input tool, or to change a frictional force between the touch display 110 and the touch input tool.

A configuration and an operation of the tactile feedback provider 150 will be further describe with reference to FIG. 5 below.

Figure 2A:
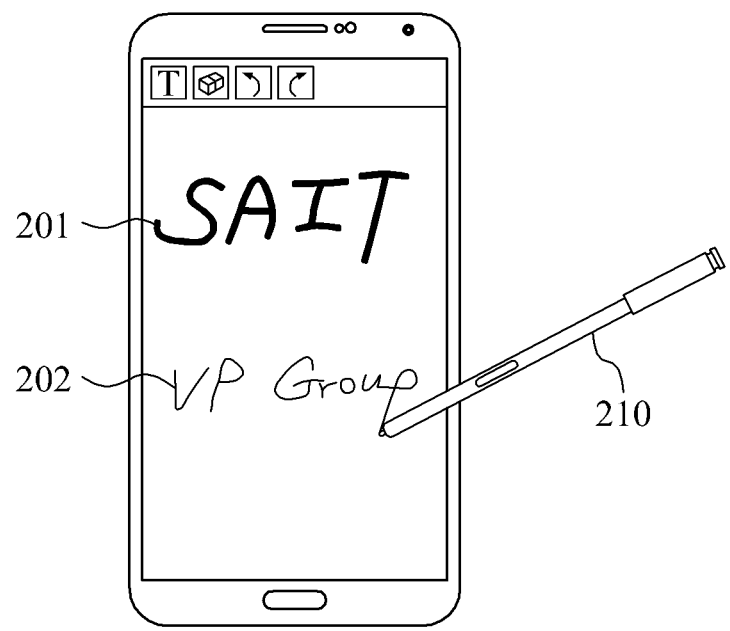
FIGS. 2A and 2B are diagrams illustrating an operation of the tactile feedback apparatus of FIG. 1.
Figure 2B:
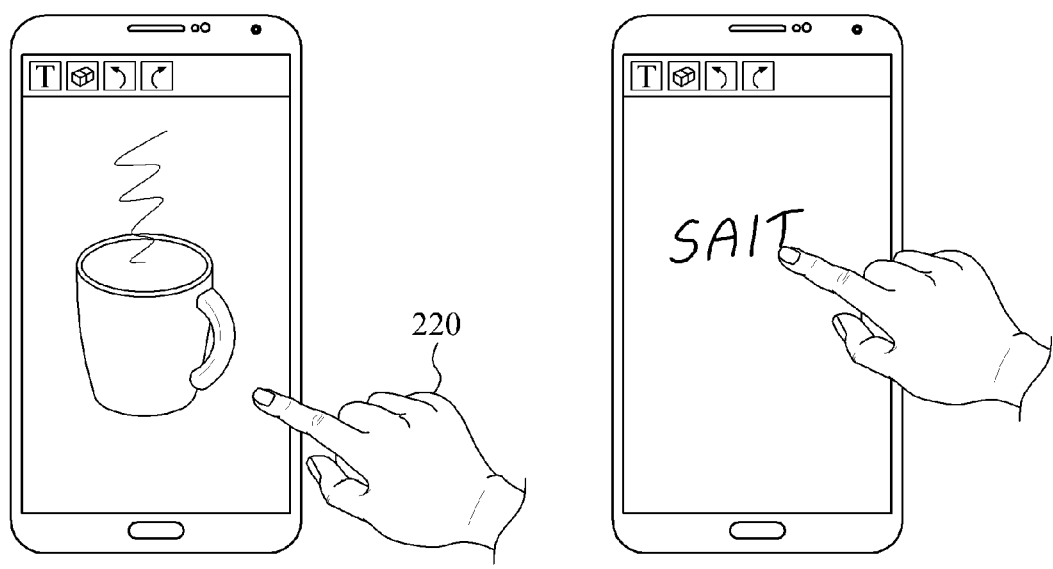

FIGS. 2A and 2B illustrate an operation of the tactile feedback apparatus 100 of FIG. 1.

Referring to FIG. 2A, when a touch input is performed on a touch display 110 using a pen 210, the tactile feedback apparatus 100 may change a frictional force between the pen 210 and the touch display based on a type of the pen 210 or a sensation of touch provided by the touch display. For example, a sensation felt by a user when writing a heavy character 201 on paper with a broad pen may be different from a sensation felt by the user when writing a slender character 202 on paper with a fine pen. Accordingly, the tactile feedback apparatus 100 may provide the same sensation as if the user writes on paper with each of the broad pen and the fine pen, by changing the frictional force between the pen 210 and the touch display, or by changing the sensation of touch provided by the touch display based on the type of the pen 210.

A portion of the touch display with which the pen 210 is in contact may be formed of glass. For example, when a user writes on the touch display with the pen 210 by touching the touch display, the user may experience a sensation of slipping on the touch display, compared to writing on paper with a ballpoint pen. However, when the user writes or draws on the touch display with the pen 210, the user may feel a sensation of writing different from a sensation of writing or drawing on paper, due to the sensation of slipping on the touch display. Additionally, because glass actually is more slippery than paper, the pen 210 may slip on the touch display, which may cause a character or a picture to be written or drawn in an unintended shape.

The tactile feedback apparatus 100 may change the frictional force between the pen 210 and the touch display, or the sensation of touch provided by the touch display, based on a texture of an object on which a touch input is performed with the pen 210 among objects displayed on the touch display and, accordingly, the user may be provided with a sensation of writing on an actual object with the pen 210. For example, the tactile feedback apparatus 100 may generate the frictional force between the pen 210 and the touch display by generating an electrostatic force between the pen 210 and the touch display. When the frictional force between the pen 210 and the touch display is generated, the pen 210 may be prevented from slipping on the touch display. Thus, it is possible to prevent a character or a picture from being written or drawn in an unintended shape. Furthermore, when an object touched by the pen 210 is changed, the tactile feedback apparatus 100 may change the frictional force between the pen 210 and the touch display by modulating the electrostatic force between the pen 210 and the touch display, and may provide the user with a sensation of writing corresponding to the changed object.

Referring to FIG. 2B, when a touch input is performed on the touch display with a finger 220 of a user, the tactile feedback apparatus 100 may change a frictional force between the finger 220 and the touch display, or a sensation of touch provided by the touch display, based on a texture of an object on which the touch input is performed with the finger 220 among objects displayed on the touch display. Accordingly, the tactile feedback apparatus 100 may provide the user with a sensation of touching an actual object with a finger.

FIG. 3 illustrates an example of tactile information according to some example embodiments.

The tactile information extractor 130 may include a database. The database may store tactile information for each of textures of objects, based on a type of touch input tools or a type of input modes selected in software. For example, a graph 310 of FIG. 3 may show a relationship between an amplitude and a frequency included in tactile information, in an example in which an object is paper and a touch input tool or an input mode is a brush. A graph 320 of FIG. 3 may show a relationship between an amplitude and a frequency included in tactile information, in an example in which an object is ice and a touch input tool or an input mode is a brush. A graph 330 of FIG. 3 may show a relationship between an amplitude and a frequency included in tactile information, in an example in which an object is paper and a touch input tool or an input mode is a pen. A graph 340 of FIG. 3 may show a relationship between an amplitude and a frequency included in tactile information, in an example in which an object is ice and a touch input tool or an input mode is a pen. In other words, the database of the tactile information extractor 130 may store, for each texture of the object, a relationship between an amplitude and a frequency that corresponds to each of the type of touch input tools and the type of input modes.

For example, when a touch input tool moves at a reference speed, the tactile information stored in the database may include information determined based on tactile feedback to be provided to a user. Additionally, the graphs 310 to 340 may show results of a Fourier transform performed on an amplitude per frequency of each of the tactile information.

Figure 4A:
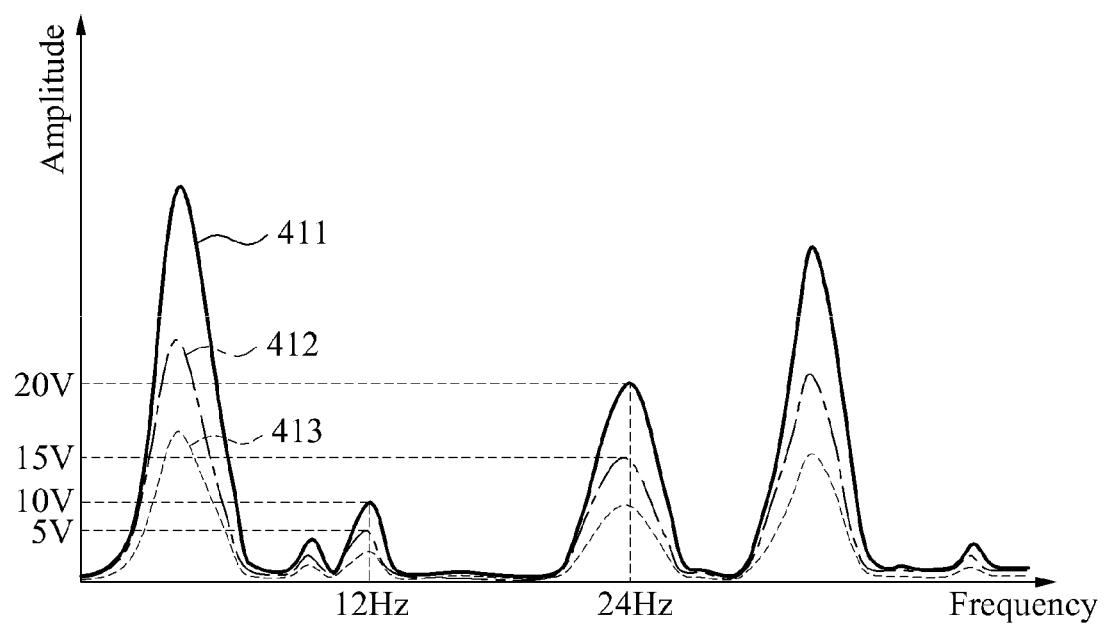
FIGS. 4A and 4B illustrate examples of tactile information changed by the tactile feedback apparatus of FIG. 1.
Figure 4B:
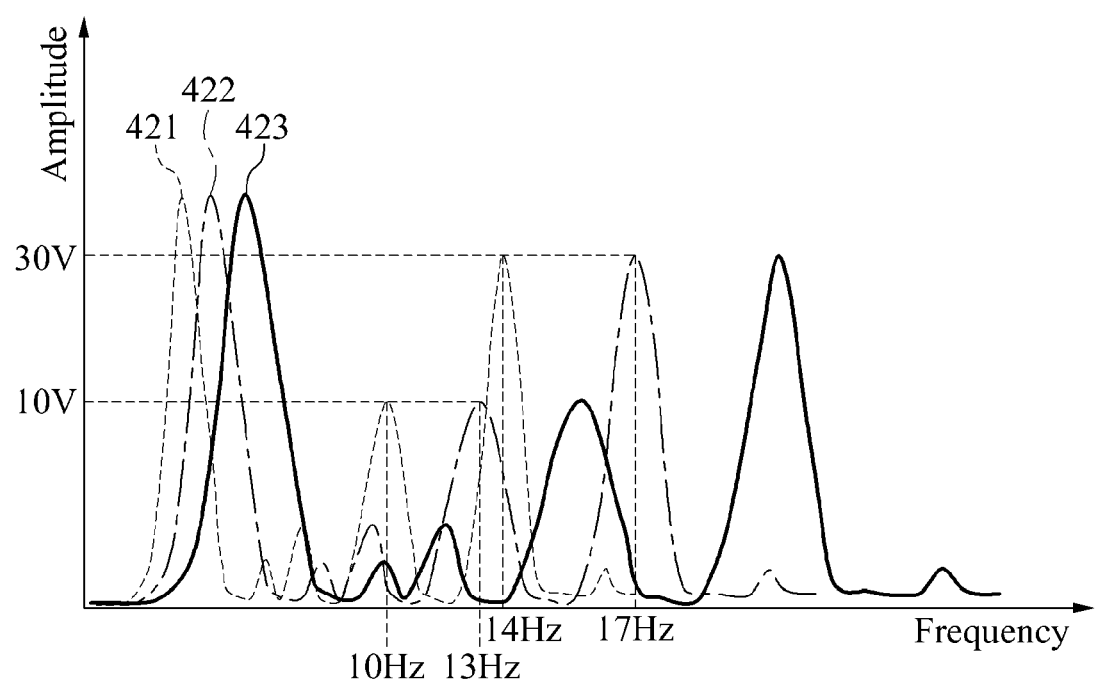

FIGS. 4A and 4B illustrate examples of tactile information changed by the tactile feedback apparatus 100 of FIG. 1.

FIG. 4A shows an example of tactile information 411 to 413 changed based on an area of a touch input tool by the tactile information changing unit 140 of FIG. 1. In some example embodiments, when a touch input tool moves at the same speed, a frictional force between the touch display 110 and the touch input tool may be determined based on an area of the touch input tool. The frictional force may be provided by the tactile feedback apparatus 100 by generating an electrostatic force. For example, when a touch input tool has an area of 0.5 square centimeters (cm2), tactile information 411 may have an amplitude of 10 volts (V) at a frequency of 12 hertz (Hz), and may have an amplitude of 30 V at a frequency of 24 Hz. In some example embodiments, when the touch input tool has an area of 1 cm2, tactile information 412 may have an amplitude of 5 V at a frequency of 12 Hz, and may have an amplitude of 15 V at a frequency of 24 Hz. Accordingly, a frictional force between the touch display and the touch input tool with the area of 1 cm2 may be identical to a frictional force between the touch display and the touch input tool with the area of 0.5 cm2.

In other words, when the area of the touch input tool is increased, the tactile information changing unit 140 may reduce an amplitude at the same frequency. For example, a user may increase an area in which a finger touches an object from 0.5 cm² to 1 cm², by laying the finger down. In some example embodiments, the tactile information changing unit 140 may change the tactile information 411 to the tactile information 412 and, accordingly, the same frictional force and the same sensation of writing may be provided to a user, despite an increase in the area in which the finger is in contact with the object.

FIG. 4B shows an example of tactile information 421 to 423 changed by the tactile information changing unit 140 based on a speed of a touch input tool. A moving speed of the touch input tool may be proportional to a frequency. Accordingly, when the moving speed of the touch input tool increases, a frequency with the same amplitude may increase. In some example embodiments, when the touch input tool moves at a speed of 10 mm/s, tactile information 421 may have an amplitude of 10 V at a frequency of 10 Hz, and may have an amplitude of 30 V at a frequency of 14 Hz. In some example embodiments, when the touch input tool moves at a speed of 20 mm/s, tactile information 422 may have an amplitude of 10 V at a frequency of 13 Hz, and may have an amplitude of 30 V at a frequency of 17 Hz. Accordingly, a frictional force between the touch display and the touch input tool moving at the speed of 10 mm/s may be identical to a frictional force between the touch display and the touch input tool moving at the speed of 20 mm/s.

The tactile information changing unit 140 may shift a frequency of tactile information based on the moving speed of the touch input tool. For example, a user may increase a moving speed of a pen used to touch an object from 10 mm/s to 20 mm/s. In some example embodiments, the tactile information changing unit 140 may shift a frequency of the tactile information 421 to be increased, and may change the tactile information 421 to the tactile information 422. Accordingly, the same frictional force and the same sensation of writing may be provided to the user.

Figure 5:
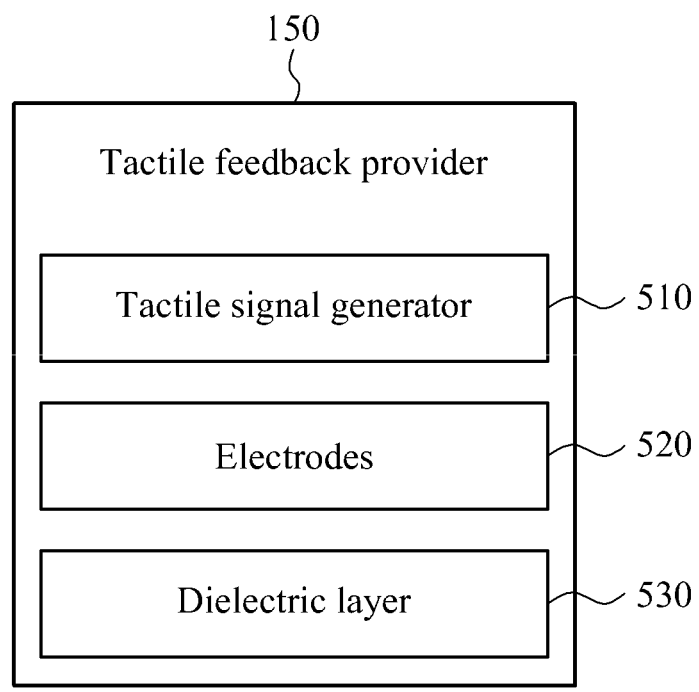
FIG. 5 is a block diagram illustrating an example of a structure of a tactile feedback provider of FIG. 1.

FIG. 5 is a block diagram illustrating a structure of the tactile feedback provider 150 of FIG. 1.

The tactile feedback provider 150 may be bonded onto the touch display 110, and may provide tactile feedback to a touch input tool used to touch an object displayed by the touch display 110.

Referring to FIG. 5, the tactile feedback provider 150 may include a tactile signal generator 510, electrodes 520, and a dielectric layer 530.

The tactile signal generator 510 may generate a tactile signal, that is, driving voltage of the electrodes 520 based on tactile information changed by the tactile information changing unit 140. Additionally, the tactile signal generator 510 may transfer the generated tactile signal to the electrodes 520. The tactile signal generator 510 may independently control a tactile signal to operate the electrodes 520. For example, the tactile signal generator 510 may generate different tactile signals to be input to the electrodes 520 based on positions of the electrodes 520. In some example embodiments, the electrodes 520 may apply an electric charge to the dielectric layer 530 based on each of the tactile signals generated by the tactile signal generator 510 and, accordingly, different electrostatic forces may be generated based on the positions of the electrodes 520.

Because a sensation of touch provided to the touch input tool corresponds to an electrostatic force, tactile feedback provided to a user may be determined based on an electrostatic force generated by an electrode 520 closest to a position in which the touch input tool is in contact with the dielectric layer 530. The tactile signal generator 510 may control a tactile signal to be input to each of the electrodes 520 and, accordingly, different tactile feedback or different frictional forces may be provided to the touch input tool, based on the position in which the touch input tool is in contact with the dielectric layer 530.

The electrodes 520 may be disposed on the touch display 110, and may apply an electric charge to the dielectric layer 530 based on the tactile signal output by the tactile signal generator 510. When the electrodes 520 apply the electric charge to the dielectric layer 530, an electrostatic force that provides tactile feedback to the touch input tool in contact with the dielectric layer 530 may be generated. The electrodes 520 may change the electrostatic force by changing the electric charge applied to the dielectric layer 530 based on a frequency, an amplitude, or an input duration of the tactile signal. Due to a change in the electrostatic force, tactile feedback provided to the touch input tool or a frictional force between the dielectric layer 530 and the touch input tool may be changed.

For example, the electrodes 520 may be formed of a transparent material such as indium tin oxide (ITO), graphene, carbon nanotube (CNT), or silver nano wire, which may enable a user to recognize content of the touch display 110 without being disturbed by the electrodes 520. Additionally, the electrodes 520 may be arranged in a form of an array on the touch display 110, and may operate independently from each other.

The dielectric layer 530 may be formed on the touch display 110 and the electrodes 520, and may be in contact with a touch input tool. The dielectric layer 530 may be formed of one of a compound with a high permittivity and an organic material with a high permittivity. The compound with the high permittivity may include, for example, at least one of strontium titanate ($SrTiO_3$), an $SrTiO_3$ compound, barium titanate ($BaTiO_3$), a $BaTiO_3$ compound, hafnium oxide ($HfO_2$), aluminum oxide ($Al_2O_3$), titanium dioxide ($TiO_2$), or zirconium dioxide ($ZrO_2$). Additionally, the touch input tool may be in contact with a ground region of a terminal including the tactile feedback apparatus 100, and may ground the electric charge applied to the dielectric layer 530. Materials used in dielectric layers may have, for example, permittivity greater than or equal to 10.

Figure 6:
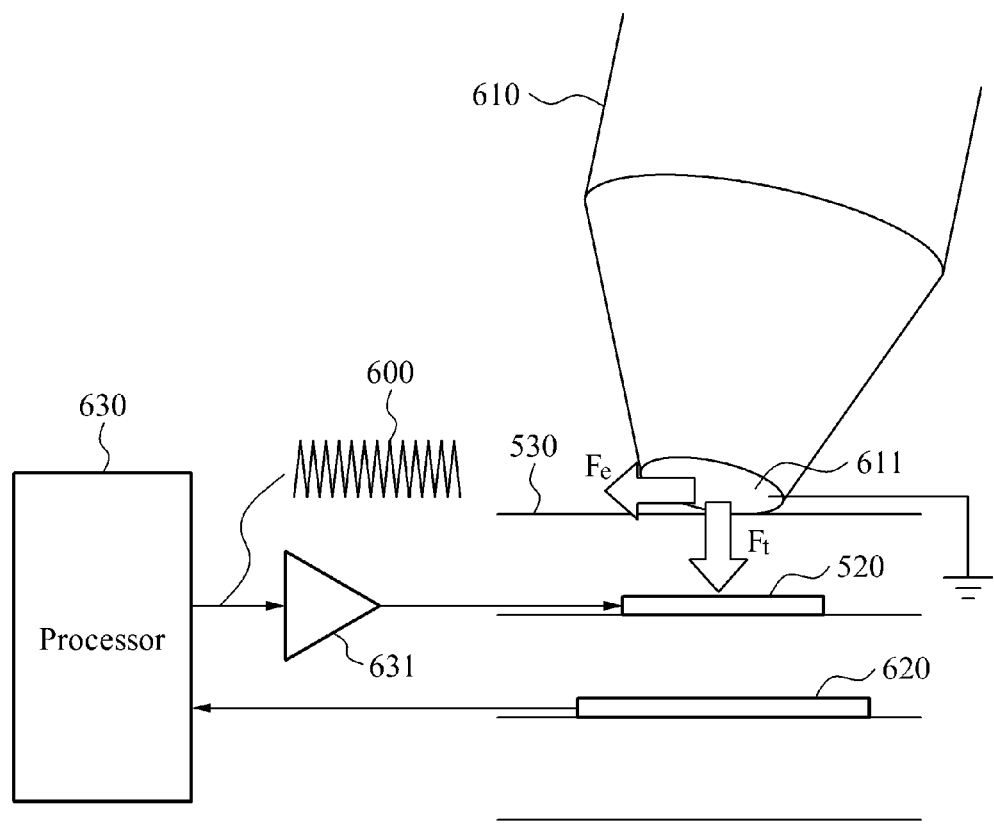
FIG. 6 illustrates an example of a process in which a tactile feedback apparatus provides tactile feedback to a pen according to some example embodiments.

FIG. 6 illustrates an example of a process in which a tactile feedback apparatus provides tactile feedback to a pen according to some example embodiments.

Referring to FIG. 6, when a pen 610 is used as a touch input tool, an electrode 520 may generate an electrostatic force $F_f$, and may generate a frictional force $F_e$ between the pen 610 and the dielectric layer 530.

When the pen 610 is in contact with the dielectric layer 530, a sensor 620 may sense contact by the pen 610, and may generate sensing information. Additionally, the sensor 620 may transfer the generated sensing information to a processor 630. The processor 630 may be, for example, hardware including the tactile information extractor 130, the tactile information changing unit 140, and the tactile feedback provider 150.

The processor 630 may extract tactile information based on the sensing information and a texture of an object displayed by the touch display 110 in a position in which the pen 610 is in contact with the dielectric layer 530, and may change the extracted tactile information. The processor 630 may output a tactile signal 600 to operate the electrode 520 based on the changed tactile information. A tactile signal amplifier 631 may amplify the tactile signal 600 output by the processor 630, and may transfer the amplified tactile signal 600 to the electrode 520.

The electrode 520 may apply electric charge to the dielectric layer 530 based on the tactile signal 600. The electric charge applied to the dielectric layer 530 may cause a voltage difference between the electrode 520 and a ground region 611 of the pen 610. Accordingly, as shown in FIG. 6, the electrostatic force $F_t$ may be generated between the pen 610 and the electrode 520 toward the electrode 520. When a user moves the pen 610, the frictional force $F_e$ with a magnitude of "$\mu \times F_t$" may be generated by the generated electrostatic force $F_t$ and a frictional coefficient $\mu$ between the pen 610 and the dielectric layer 530. Additionally, the processor 630 may modulate the tactile signal 600 based on at least one of a DC offset, a voltage amplitude, a voltage frequency combination, or a voltage duration of the tactile information, and may change tactile feedback based on a frictional force and an electrostatic force. Accordingly, by modulating the tactile signal 600, the processor 630 may provide a user using a touch input tool with different sensations of writing in the same position.

Figure 7A:
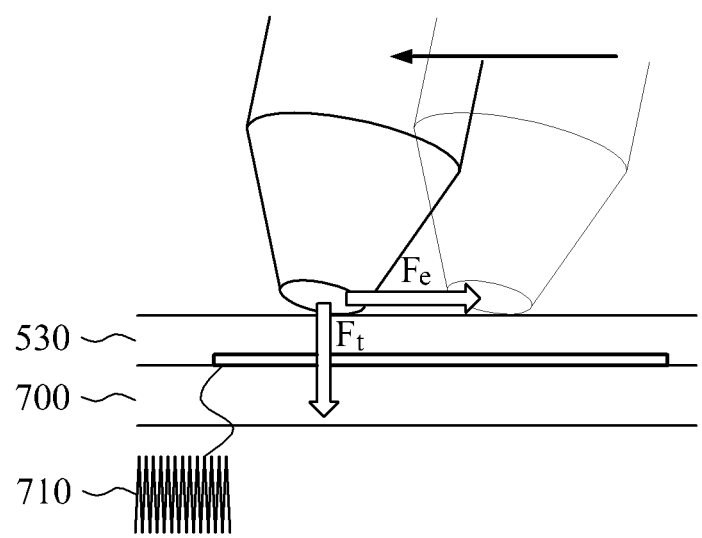
FIGS. 7A through 7C illustrate examples of a change in a frictional force between a tactile feedback apparatus and a touch input tool according to some example embodiments.
Figure 7B:
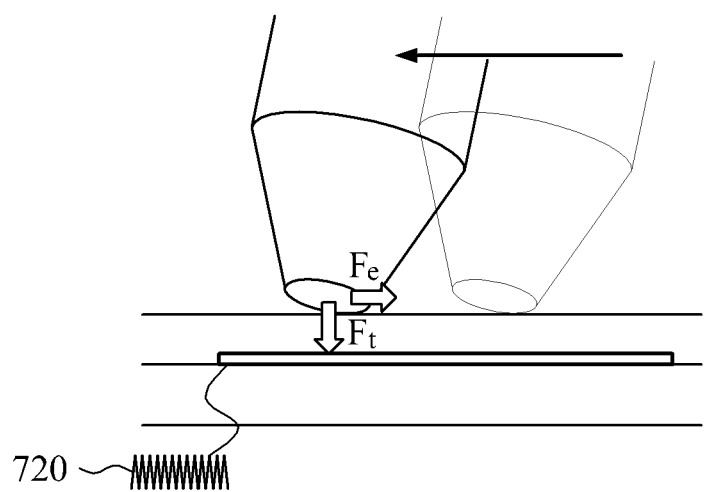
Figure 7C:
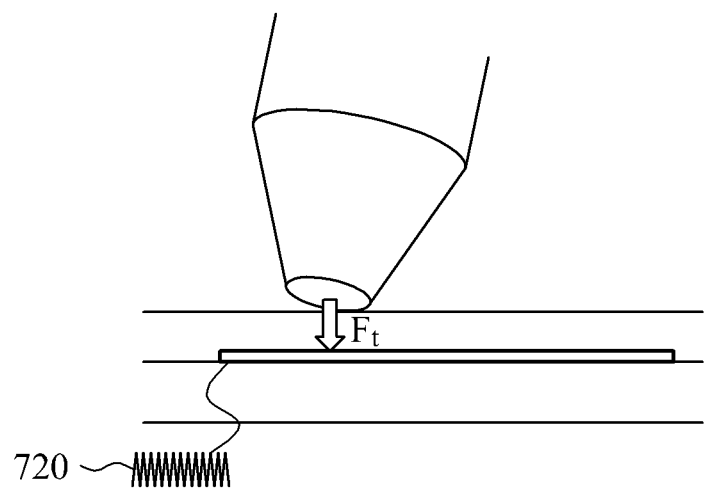

FIGS. 7A through 7C illustrate examples of a change in a frictional force between a tactile feedback apparatus and a touch input tool according to some example embodiments.

Referring to FIG. 7A, the tactile signal generator 510 of the tactile feedback apparatus 100 may output a tactile signal 710 with a high frequency and a high amplitude to an electrode bonded onto a touch display 700. The tactile signal 710 may cause a voltage difference between a pen and the electrode and, accordingly, an electrostatic force and a frictional force may be generated. Referring to FIG. 7B, the tactile signal generator 510 may output a tactile signal 720 to an electrode bonded onto the touch display 700. A frequency and an amplitude of the tactile signal 720 may be lower than those of the tactile signal 710. The tactile signal 720 may cause a voltage difference between a pen and the electrode and, accordingly, an electrostatic force and a frictional force may be generated. The voltage difference, the electrostatic force, and the frictional force generated in FIG. 7B may be less than the voltage difference, the electrostatic force, and the frictional force generated in FIG. 7A.

Based on a frequency and an amplitude of a tactile signal, a magnitude of an electrostatic force between a pen and an electrode, and a magnitude of a frictional force between the pen and the dielectric layer 530 bonded onto the touch display 110 may be changed.

Referring to FIG. 7C, when a pen does not move, a frictional force may not be generated between the pen and the dielectric layer 530 bonded onto the touch display 110. Accordingly, tactile feedback to be provided to a user holding the pen may not be generated.

Figure 8:
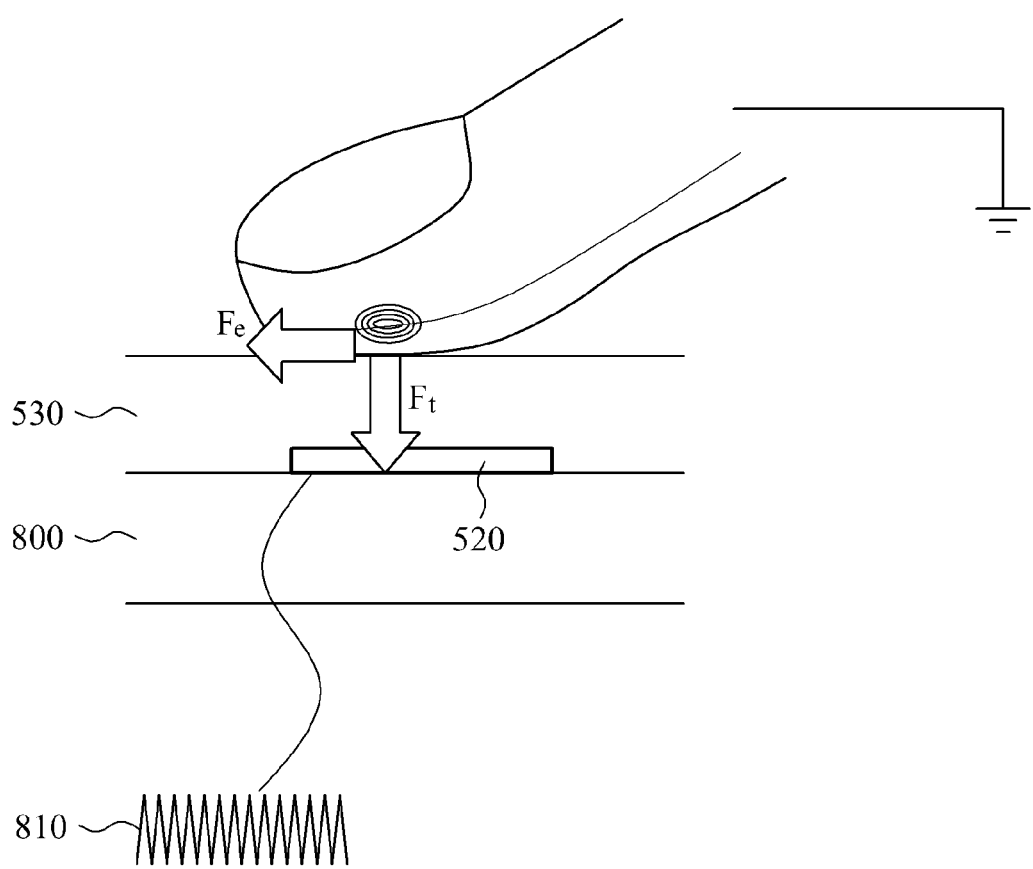
FIG. 8 illustrates an example of a process in which a tactile feedback apparatus provides tactile feedback to a finger according to some example embodiments.

FIG. 8 illustrates an example of a process in which a tactile feedback apparatus provides tactile feedback to a finger according to some example embodiments.

Referring to FIG. 8, when a finger of a user is used as a touch input tool, tactile feedback may be provided to the finger.

When the finger is in contact with the dielectric layer 530, the tactile signal generator 510 may output a tactile signal 810 to an electrode 520 bonded onto a touch display 800. The electrode 520 may apply an electric charge to the dielectric layer 530 based on the tactile signal 810. The electric charge applied to the dielectric layer 530 may cause a voltage difference between the finger and the electrode 520 and, accordingly, an electrostatic force $F_t$ may be generated between the finger and the electrode 520 toward the electrode 520, as shown in FIG. 8. When the user moves the finger, a frictional force $F_e$ with a magnitude of "$\mu \times F_t$" may be generated by the generated electrostatic force $F_t$ and a frictional coefficient $\mu$ between the finger and the dielectric layer 530. The tactile signal generator 510 may modulate the tactile signal 810 based on movement of the finger and a texture of an object displayed by the touch display 800, and may change tactile feedback based on a frictional force and an electrostatic force. By modulating the tactile signal 810, the tactile signal generator 510 may provide a user using a touch input tool with difference sensations of writing in the same position.

Figure 9:
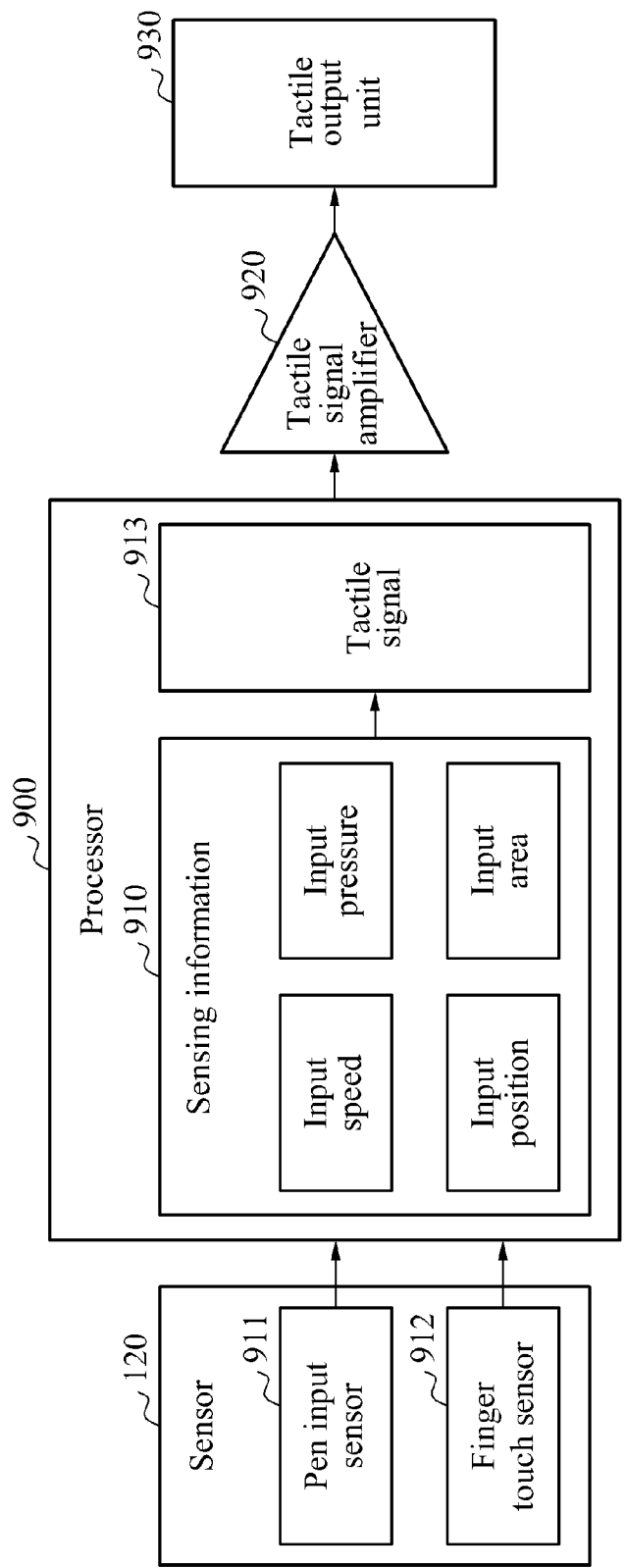
FIG. 9 illustrates an example of a tactile feedback apparatus according to some example embodiments.

FIG. 9 illustrates an example of a tactile feedback apparatus according to some example embodiments.

Referring to FIG. 9, the tactile feedback apparatus may include the sensor 120, a processor 900, a tactile signal amplifier 920, and a tactile output unit 930.

The sensor 120 may sense a touch input tool used to touch an object displayed by the touch display 110, as described above in FIG. 1, may generate sensing information 910, and may transfer the generated sensing information 910 to the processor 900. Additionally, the sensor 120 may include a pen input sensor 911 and a finger touch sensor 912. The pen input sensor 911 may operate when a pen is used as a touch input tool, and the finger touch sensor 912 may operate when a finger is used as a touch input tool. The pen input sensor 911 may measure an input position, an input speed, and an input pressure of the pen. Additionally, the finger touch sensor 912 may measure an input position, an input speed, an input area, and an input pressure of the finger.

The processor 900 may include the tactile information extractor 130, the tactile information changing unit 140, and the tactile feedback provider 150 of FIG. 1. The processor 900 may extract tactile information based on the sensing information 910 and a texture of an object displayed by the touch display 110, and may change the extracted tactile information. Additionally, the processor 900 may output a tactile signal 913 to operate the tactile output unit 930 based on the changed tactile information.

The tactile signal amplifier 920 may amplify the tactile signal 913 output by the processor 900, and may transfer the amplified tactile signal 913 to the tactile output unit 930.

The tactile output unit 930 may apply an electric charge to a dielectric layer based on the received tactile signal 913. For example, the tactile output unit 930 may be an electrode disposed between a touch display and a dielectric layer. Additionally, due to the electric charge applied to the dielectric layer, an electrostatic force may be generated between the touch input tool and the tactile output unit 930. When a user moves the touch input tool, a frictional force may be generated by the generated electrostatic force and a frictional coefficient between the touch input tool and the dielectric layer. In addition, the user may feel the generated frictional force as tactile feedback that provides a sensation of writing.

Figure 10:
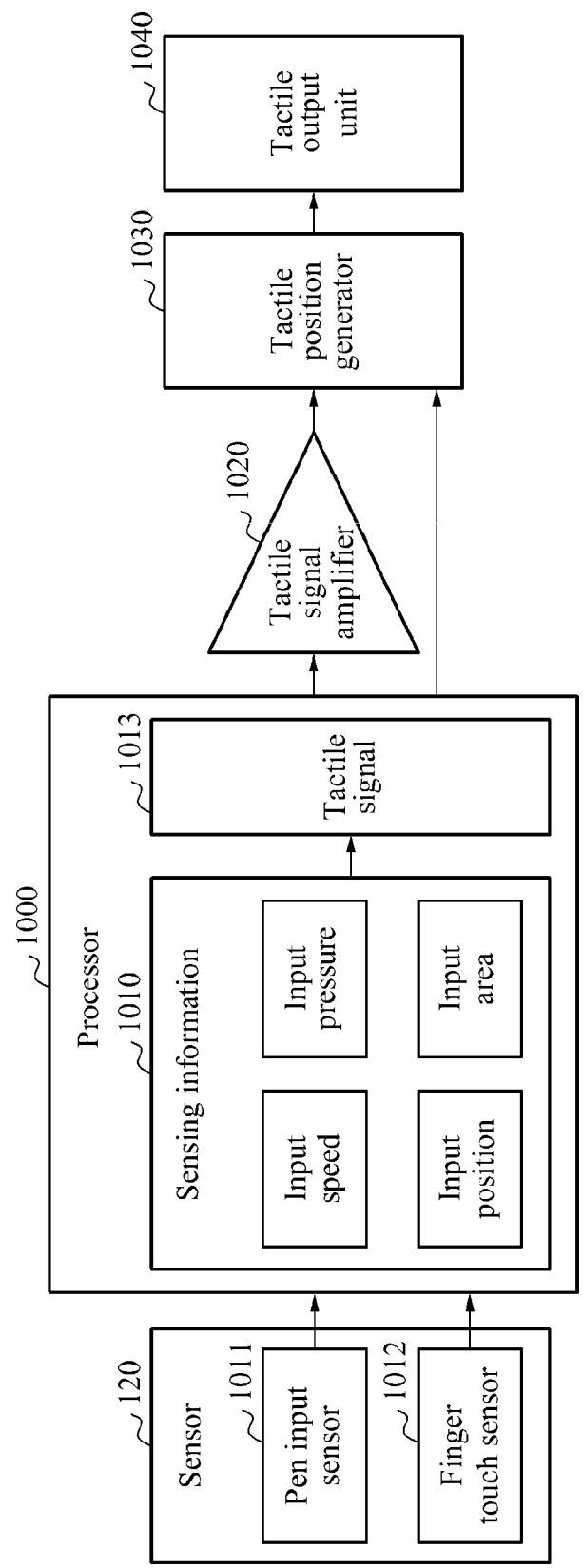
FIG. 10 illustrates an example of a tactile feedback apparatus including a plurality of electrodes according to some example embodiments.

FIG. 10 illustrates an example of a tactile feedback apparatus including a plurality of electrodes according to some example embodiments.

In FIG. 10, a tactile output unit 1040 may include a plurality of electrodes. When a finger of a user touches a position of each of the electrodes, the tactile feedback apparatus may provide different tactile feedback for each finger.

As shown in FIG. 10, the tactile feedback apparatus may include the sensor 120, a processor 1000, a tactile signal amplifier 1020, a tactile position generator 1030, and a tactile output unit 1040.

The sensor 120 may sense a touch input tool used to touch an object displayed by the touch display 110, as described above in FIG. 1, may generate sensing information 1010, and may transfer the generated sensing information 1010 to the processor 1000. Additionally, the sensor 120 may include a pen input sensor 1011 and a finger touch sensor 1012. The pen input sensor 1011 may operate when a pen is used as a touch input tool, and the finger touch sensor 1012 may operate when a finger is used as a touch input tool. The pen input sensor 1011 may measure an input position, an input speed, and an input pressure of the pen. Additionally, the finger touch sensor 1012 may measure an input position, an input speed, an input area, and an input pressure of the finger.

The processor 1000 may include the tactile information extractor 130, the tactile information changing unit 140, and the tactile feedback provider 150 of FIG. 1. The processor 1000 may extract tactile information based on the sensing information 1010 and a texture of an object displayed by the touch display 110, and may change the extracted tactile information. The processor 1000 may output a tactile signal 1013 to operate the tactile output unit 1040 based on the changed tactile information.

The tactile signal amplifier 1020 may amplify the tactile signal 1013 output by the processor 1000, and may transfer the amplified tactile signal 1013 to the tactile position generator 1030. In addition or in the alternative, the tactile signal amplifier 1020 may transfer at least part of the tactile signal 1013 directly to the tactile position generator 1030.

The tactile position generator 1030 may select an electrode to which tactile feedback is to be transferred by the tactile position generator 1030, based on the sensing information 1010. Additionally, the tactile position generator 1030 may transfer the amplified tactile signal 1013 to the selected electrode. For example, the tactile position generator 1030 may use a demultiplexer (DEMUX) to transfer the amplified tactile signal 1013 to the selected electrode.

The tactile output unit 1040 may apply an electric charge to a dielectric layer based on the received tactile signal 1013. For example, the tactile output unit 1040 may include a plurality of electrodes disposed between the touch display and the dielectric layer. Additionally, due to the electric charge applied to the dielectric layer, an electrostatic force may be generated between the touch input tool and the tactile output unit 1040. When a user moves the touch input tool, a frictional force may be generated by the generated electrostatic force and a frictional coefficient between the touch input tool and the dielectric layer. In addition, the user may feel the generated frictional force as tactile feedback that provides a sensation of writing.

Figure 11:
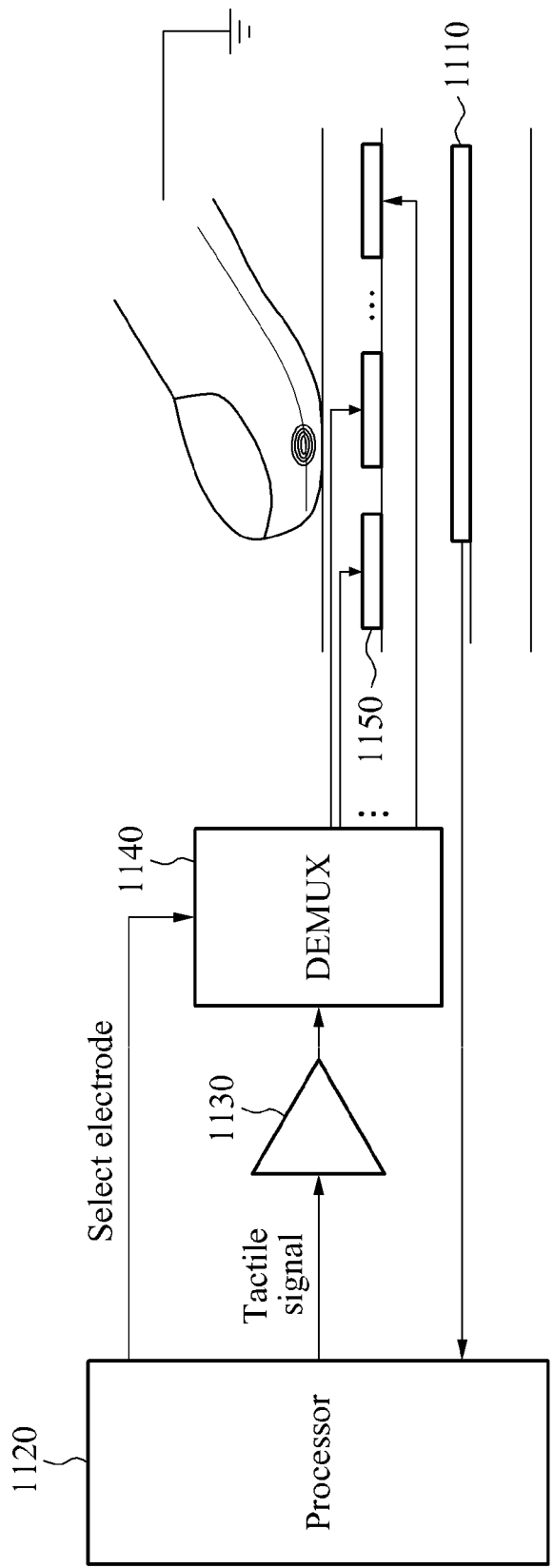
FIG. 11 illustrates an example of a tactile feedback method using a plurality of electrodes according to some example embodiments.

FIG. 11 illustrates an example of a tactile feedback method using a plurality of electrodes according to some example embodiments.

When a finger is in contact with a dielectric layer, a sensor 1110 may sense contact by the finger, and may generate sensing information. Additionally, the sensor 1110 may transfer the generated sensing information to a processor 1120. The processor 1120 may be, for example, hardware including the tactile information extractor 130, the tactile information changing unit 140, and the tactile feedback provider 150 of FIG. 1.

The processor 1120 may extract tactile information based on the sensing information and a texture of an object displayed by the touch display 110 in a position in which the finger is in contact with the dielectric layer, and may change the extracted tactile information. Additionally, the processor 1120 may select an electrode to which tactile feedback is to be transferred from among a plurality of electrodes 1150, based on the sensing information.

The processor 1120 may output, to a tactile signal amplifier 1130, a tactile signal to operate the electrodes 1150 based on the changed tactile information, and may output electrode information on the selected electrode to a DEMUX 1140. The tactile signal amplifier 1130 may amplify the tactile signal output by the processor 1120, and may transfer the amplified tactile signal to the DEMUX 1140.

The DEMUX 1140 may transmit the tactile signal amplified by the tactile signal amplifier 1130, based on the electrode information transmitted by the processor 1120. For example, the DEMUX 1140 may set a route through which the tactile signal is to be transferred to an electrode corresponding to the electrode information using at least one switch, and may transmit the amplified tactile signal via the set route.

An electrode that receives the tactile signal among the electrodes 1150 may apply an electric charge to a dielectric layer based on the tactile signal. Due to the electric charge applied to the dielectric layer, an electrostatic force may be generated between the finger and the electrode. When a user moves the finger, a frictional force may be generated by the generated electrostatic force and a frictional coefficient between the finger and the dielectric layer. Additionally, the user may feel the generated frictional force as tactile feedback that provides a sensation of writing.

Figure 12:
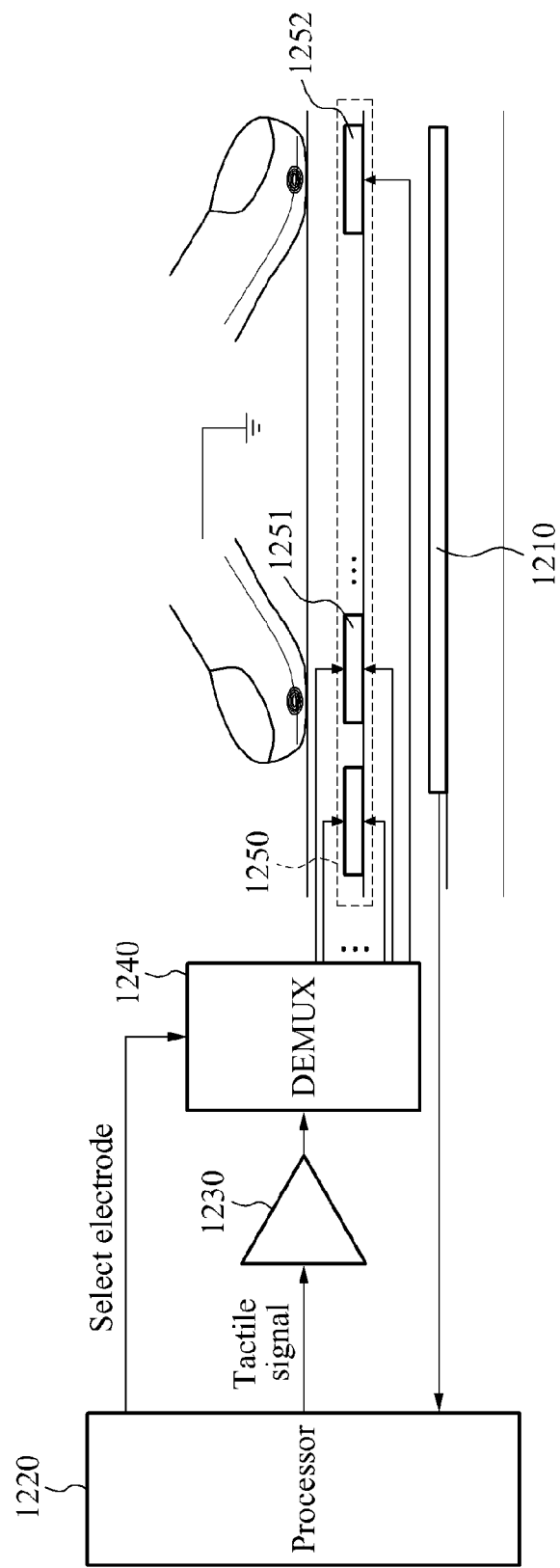
FIG. 12 illustrates an example of a method of providing tactile feedback to a plurality of fingers according to some example embodiments.

FIG. 12 illustrates an example of a method of providing tactile feedback to a plurality of fingers according to some example embodiments.

Electrodes 1250 may provide tactile feedback or a frictional force by applying electric charges to a dielectric layer, and may include, for example, a first electrode 1251 and a second electrode 1252, as shown in FIG. 12. A processor 1220 of a tactile feedback apparatus may provide different frictional forces or different tactile feedback for each of a first finger touching a position of the first electrode 1251 and a second finger touching a position of a second electrode 1252.

A sensor 1210 may sense the first finger and the second finger that touch the dielectric layer, and may generate sensing information. The sensor 1210 may transfer the generated sensing information to the processor 1220.

The processor 1220 may extract tactile information based on the sensing information and a texture of an object displayed by the touch display 110 in each of a position in which the first finger is in contact with the dielectric layer and a position in which the second finger is in contact with the dielectric layer, and may change the extracted tactile information. In some example embodiments, when different objects are displayed by the touch display 110 in the positions, the processor 1220 may individually extract tactile information corresponding to the first finger and tactile information corresponding to the second finger. In some example embodiments, when the first finger and the second finger are different from each other in at least one of a moving speed, a touch area, or a pressure, despite the same object being displayed by the touch display 110 in the positions, the processor 1220 may individually change the tactile information corresponding to the first finger and the tactile information corresponding to the second finger. Additionally, the processor 1220 may select the first electrode 1251 and the second electrode 1252 from among the electrodes 1250, based on the sensing information.

The processor 1220 may generate a tactile signal to operate the first electrode 1251 and a tactile signal to operate the second electrode 1252, based on the tactile information corresponding to the first finger and the tactile information corresponding to the second finger, may output the tactile signals to a tactile signal amplifier 1230, and may output electrode information associated with selection of the first electrode 1251 and the second electrode 1252 to a DEMUX 1240. The tactile signal amplifier 1230 may amplify the tactile signals output by the processor 1220, and may transfer the amplified tactile signals to the DEMUX 1240.

The DEMUX 1240 may transmit the tactile signal to operate the first electrode 1251 and the tactile signal to operate the second electrode 1252 to the first electrode 1251 and the second electrode 1252, respectively.

Each of the first electrode 1251 and the second electrode 1252 may apply an electric charge to a dielectric layer based on the received tactile signal. Because an electric charge applied to a dielectric layer bonded onto the first electrode 1251 is different from an electric charge applied to a dielectric layer bonded onto the second electrode 1252, a user may feel different tactile feedback, or different frictional forces, with the first finger and the second finger.

Figure 13:
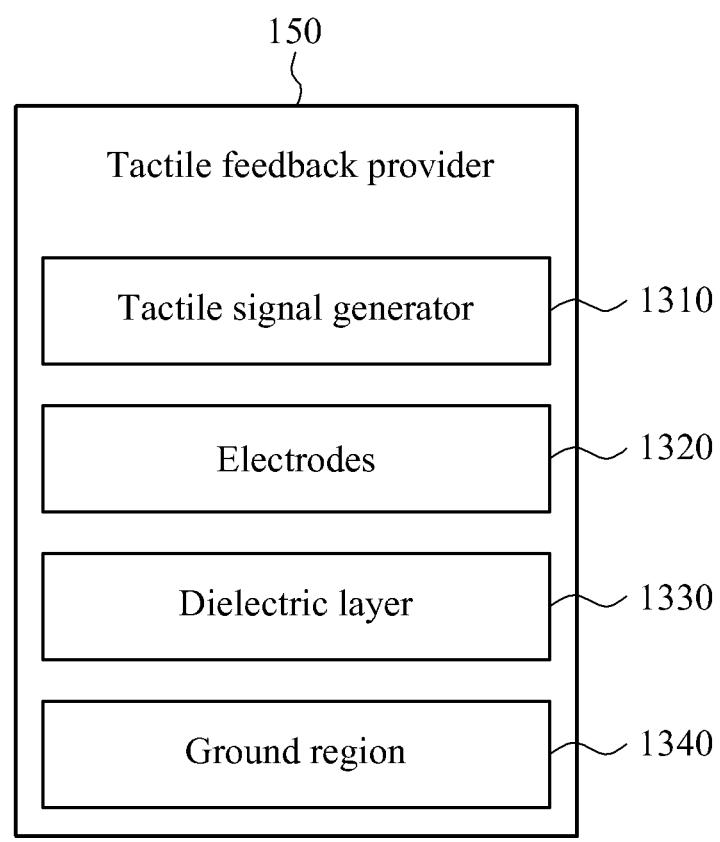
FIG. 13 illustrates another example of the structure of the tactile feedback provider.

FIG. 13 illustrates another example of the structure of the tactile feedback provider 150.

Referring to FIG. 13, the tactile feedback provider 150 may include a tactile signal generator 1310, electrodes 1320, a dielectric layer 1330, and a ground region 1340.

The tactile signal generator 1310, the electrodes 1320, and the dielectric layer 1330 may be identical to the tactile signal generator 510, the electrodes 520, and the dielectric layer 530 of FIG. 5, respectively and, accordingly further description thereof is omitted herein.

The ground region 1340 may be disposed between the electrodes 1320, and may be configured to ground and discharge an electric charge applied to the dielectric layer 1330.

The tactile feedback provider 150 may dispose the ground region 1340 between the electrodes 1320 and, accordingly, the electric charge applied to the dielectric layer 1330 may be discharged without a touch input tool and a separate ground region. Additionally, the electrodes 1320 may re-apply an electric charge to the dielectric layer 1330 from which the electric charge is discharged and, accordingly, an electrostatic force that provides a user with tactile feedback may be generated.

Figure 14:
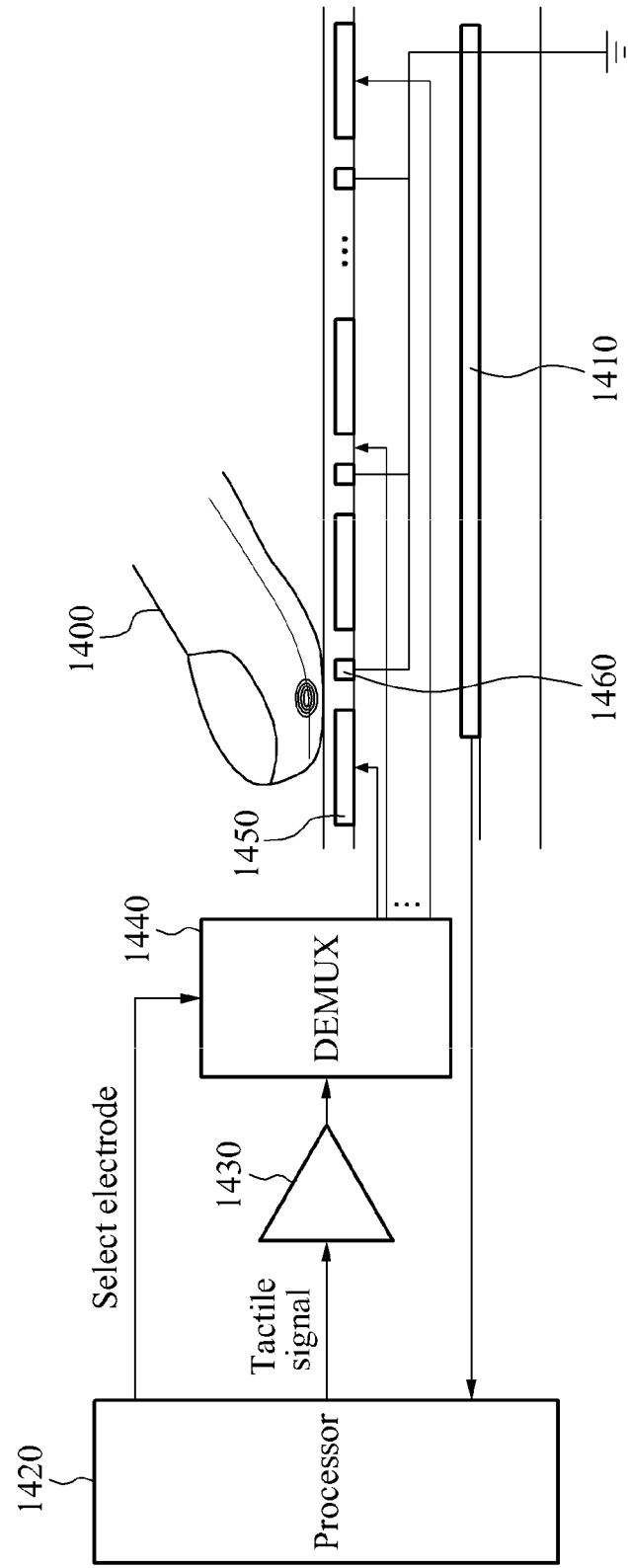
FIG. 14 illustrates another example of a structure of a tactile feedback apparatus according to some example embodiments.

FIG. 14 illustrates another example of a structure of a tactile feedback apparatus according to some example embodiments.

A sensor 1410 may sense contact by a finger 1400, and may generate sensing information. Additionally, the sensor 1410 may transfer the generated sensing information to a processor 1420.

The processor 1420 may extract tactile information based on the sensing information and a texture of an object displayed by a touch display in a position in which the finger 1400 is in contact with the touch display, and may change the extracted tactile information. Additionally, the processor 1420 may select an electrode to which tactile feedback is to be transferred, from among a plurality of electrodes 1450 based on the sensing information.

The processor 1420 may output a tactile signal to operate the electrodes 1450 based on the changed tactile information to a tactile signal amplifier 1430, and may output electrode information on the selected electrode to a DEMUX 1440.

The tactile signal amplifier 1430 may amplify the tactile signal output by the processor 1420, and may transfer the amplified tactile signal to the DEMUX 1440.

The DEMUX 1440 may transmit the tactile signal amplified by the tactile signal amplifier 1430 based on the electrode information output by the processor 1420.

An electrode that receives the tactile signal among the electrodes 1450 may apply an electric charge to a dielectric layer, based on the tactile signal. Due to the electric charge applied to the dielectric layer, an electrostatic force may be generated between the finger 1400 and the electrode. When a user moves the finger 1400, a frictional force may be generated by the generated electrostatic force and a frictional coefficient between the finger 1400 and the dielectric layer.

A ground region 1460 may ground and discharge the electric charge applied to the dielectric layer by the electrodes 1450. An interval between the ground region 1460 and the electrodes 1450 may be shorter than an interval between the finger 1400 and the electrodes 1450, and an interval between the finger 1400 and the ground region 1460. Additionally, the electric charge applied to the dielectric layer by the electrodes 1450 may be applied to the finger 1400 and, accordingly, an electrostatic force may be generated. The electric charge applied to the finger 1400 and the electric charge applied to the dielectric layer may be discharged through the ground region 1460. When the electric charges are discharged, the ground region 1460 may enable the electrodes 1450 to re-apply an electric charge to the finger 1400 and the dielectric layer.

Figure 15:
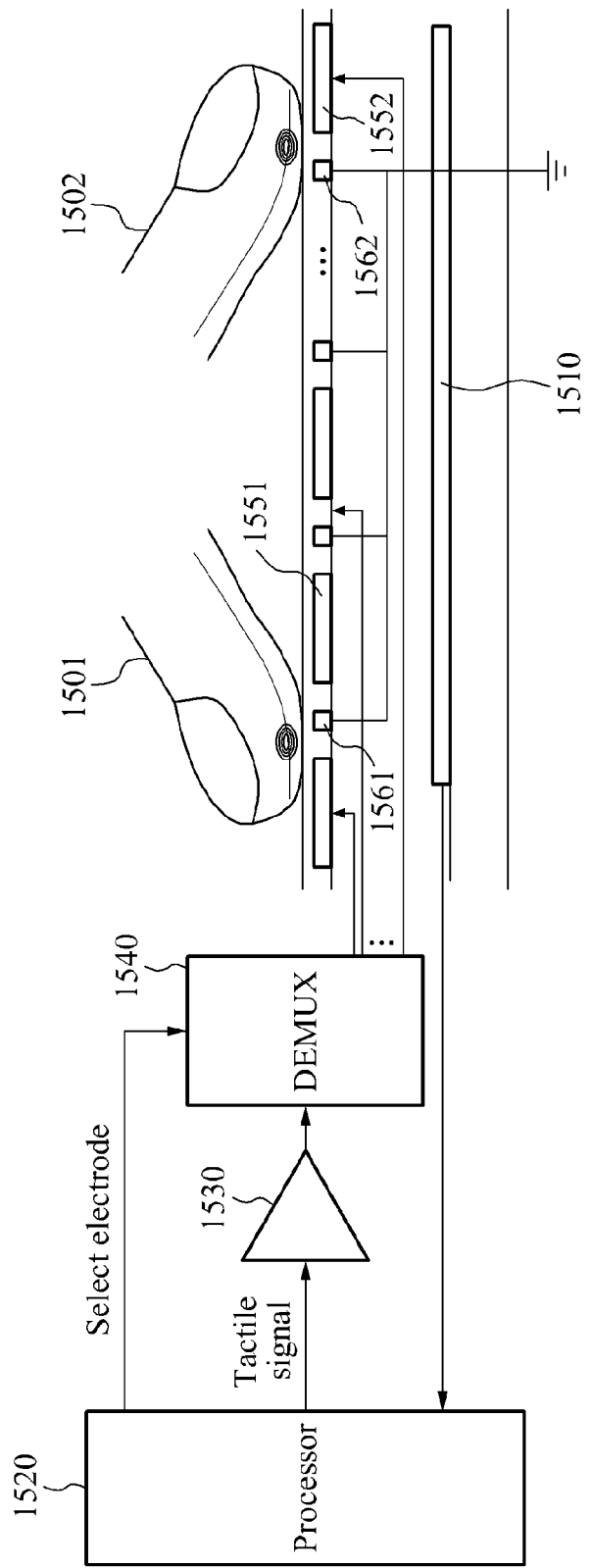
FIG. 15 illustrates an example of providing tactile feedback to a plurality of fingers in the tactile feedback provider of FIG. 13.

FIG. 15 illustrates an example of providing tactile feedback to a plurality of fingers in the tactile feedback provider 150 of FIG. 13.

Electrodes may apply an electric charge to a dielectric layer, and may provide a frictional force or tactile feedback. The electrodes may include a first electrode 1551 and a second electrode 1552, as shown in FIG. 15. A processor 1520 of a tactile feedback apparatus may provide different frictional forces or different tactile feedback for each of a first finger 1501 touching a position of the first electrode 1551 and a second finger 1502 touching a position of the second electrode 1552.

A sensor 1510 may sense the first finger 1501 and the second finger 1502 that touch the dielectric layer, and may generate sensing information. Additionally, the sensor 1510 may transfer the generated sensing information to the processor 1520.

The processor 1520 may extract tactile information corresponding to the first finger 1501, based on sensing information associated with the first finger 1501 and a texture of an object displayed by the touch display 110 in a position in which the first finger 1501 is in contact with the dielectric layer. The processor 1520 may change the tactile information corresponding to the first finger 1501, based on sensing information, for example, a moving speed, an area, or a pressure of the first finger 1501. Additionally, the processor 1520 may extract tactile information corresponding to the second finger 1502, based on sensing information associated with the second finger 1502 and a texture of an object displayed by the touch display 110 in a position in which the second finger 1502 is in contact with the dielectric layer. The processor 1520 may change the tactile information corresponding to the second finger 1502, based on sensing information, for example, a moving speed, an area, or a pressure of the second finger 1502. Furthermore, the processor 1520 may select the first electrode 1551 and the second electrode 1552 from among the electrodes, based on the sensing information.

The processor 1520 may generate a tactile signal to operate the first electrode 1551 and a tactile signal to operate the second electrode 1552, based on the tactile information corresponding to the first finger 1501 and the tactile information corresponding to the second finger 1502, respectively, may output the tactile signals to a tactile signal amplifier 1530, and may output electrode information associated with selection of the first electrode 1551 and the second electrode 1552 to a DEMUX 1540. The tactile signal amplifier 1530 may amplify the tactile signals output by the processor 1520, and may transfer the amplified tactile signals to the DEMUX 1540.

The DEMUX 1540 may transmit the tactile signal to operate the first electrode 1551 and the tactile signal to operate the second electrode 1552 to the first electrode 1551 and the second electrode 1552, respectively.

Each of the first electrode 1551 and the second electrode 1552 may apply an electric charge to a dielectric layer based on the received tactile signal. Because an electric charge applied to a dielectric layer bonded onto the first electrode 1551 may be different from an electric charge applied to a dielectric layer bonded onto the second electrode 1552, a user may feel different tactile feedback or different frictional forces with the first finger 1501 and the second finger 1502.

Each of a first ground region 1561 and a second ground region 1562 may ground and discharge an electric charge applied to the dielectric layer by each of the first electrode 1551 and the second electrode 1552. When electric charges applied to the dielectric layer, the first finger 1501 and the second finger 1502 are discharged, the first ground region 1561 and the second ground region 1562 may enable the first electrode 1551 and the second electrode 1552 to re-apply an electric charge to the dielectric layer, the first finger 1501 and the second finger 1502.

Figure 16:
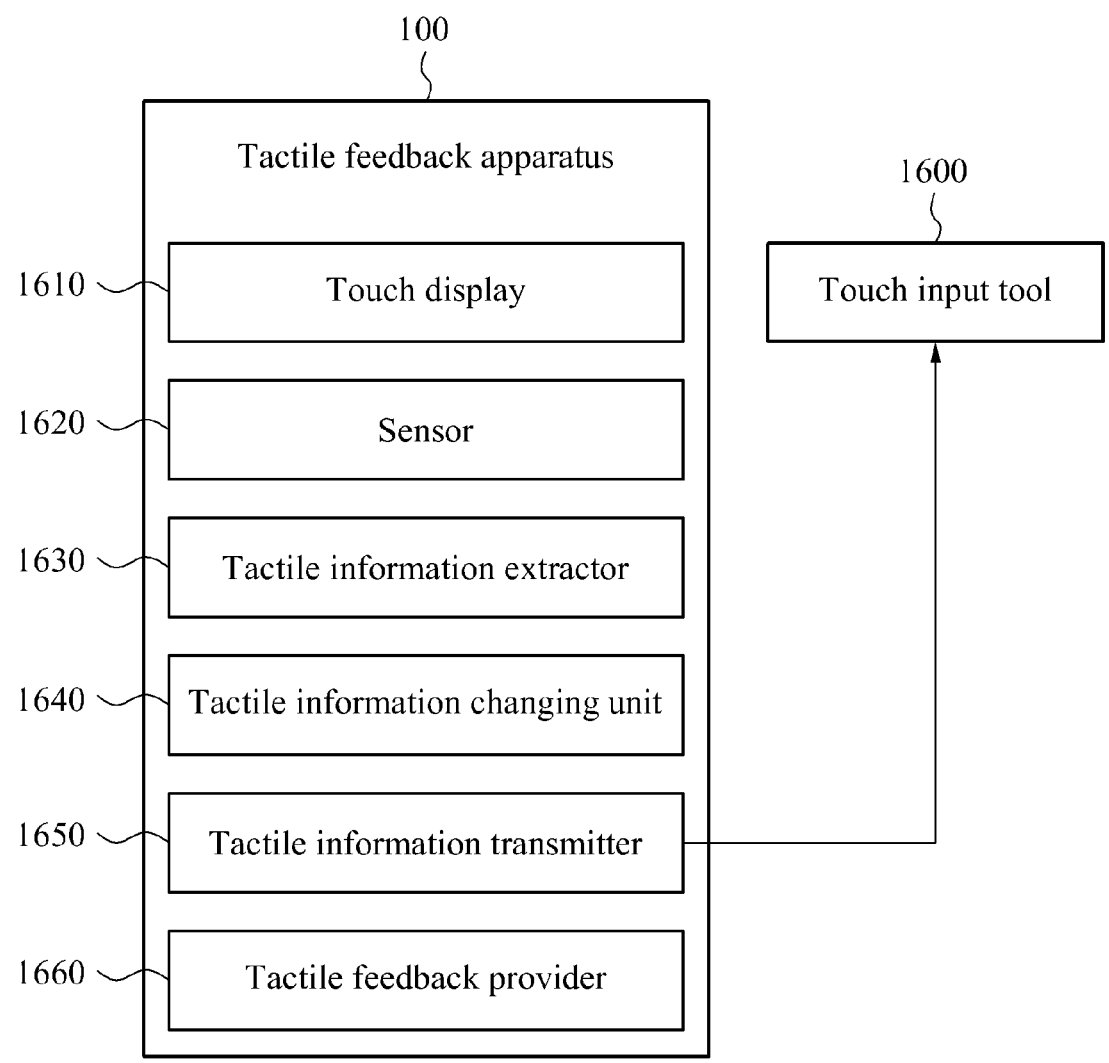
FIG. 16 illustrates another example of the structure of the tactile feedback apparatus according to some example embodiments.

FIG. 16 illustrates another example of a structure of the tactile feedback apparatus 100 of FIG. 1.

In FIG. 16, a device for applying an electric charge may be included in a touch input tool.

Referring to FIG. 16, the tactile feedback apparatus 100 may include a touch display 1610, a sensor 1620, a tactile information extractor 1630, a tactile information changing unit 1640, a tactile information transmitter 1650, and a tactile feedback provider 1660.

The touch display 1610, the sensor 1620, the tactile information extractor 1630, and the tactile information changing unit 1640 may be identical to the touch display 110, the sensor 120, the tactile information extractor 130, and the tactile information changing unit 140 of FIG. 1, respectively and, accordingly further description thereof is omitted herein.

The tactile information transmitter 1650 may transmit tactile information changed by the tactile information changing unit 1640 to a touch input tool 1600. In some example embodiments, the tactile information transmitter 1650 may be connected to the touch input tool 1600 via a cable, and may transmit the tactile information to the touch input tool 1600 via the cable. In some example embodiments, the tactile information transmitter 1650 and the touch input tool 1600 may have a wireless communication function, and the tactile information transmitter 1650 may transmit the tactile information to the touch input tool 1600 using the wireless communication function.

The touch input tool 1600 may include an electrode, and may be, for example, one of writing instruments capable of applying an electric charge to the tactile feedback provider 1660 using an electrode. For example, the touch input tool 1600 may receive tactile information from the tactile information transmitter 1650, may operate the electrode based on the received tactile information, and may apply an electric charge to the tactile feedback provider 1660. The touch input tool 1600 may be, for example, a touch pen in which an electrode is installed in a region to touch the touch display 1610.

The tactile feedback provider 1660 may include a ground region. The tactile feedback provider 1660 may generate an electrostatic force caused by a voltage difference between the ground region and the electrode operated by the touch input tool 1600, based on the tactile information, and may provide the touch input tool 1600 with tactile feedback based on the tactile information. For example, the tactile feedback provider 1660 may include a dielectric layer and a ground region. In some example embodiments, when the touch input tool 1600 applies an electric charge to the dielectric layer, a voltage difference between the touch input tool 1600 and the ground region may be generated, and an electrostatic force may be generated between the touch input tool 1600 and the ground region. The generated electrostatic force may provide tactile feedback to the touch input tool 1600, or may change a frictional force between the touch display 1610 and the touch input tool 1600.

Figure 17:
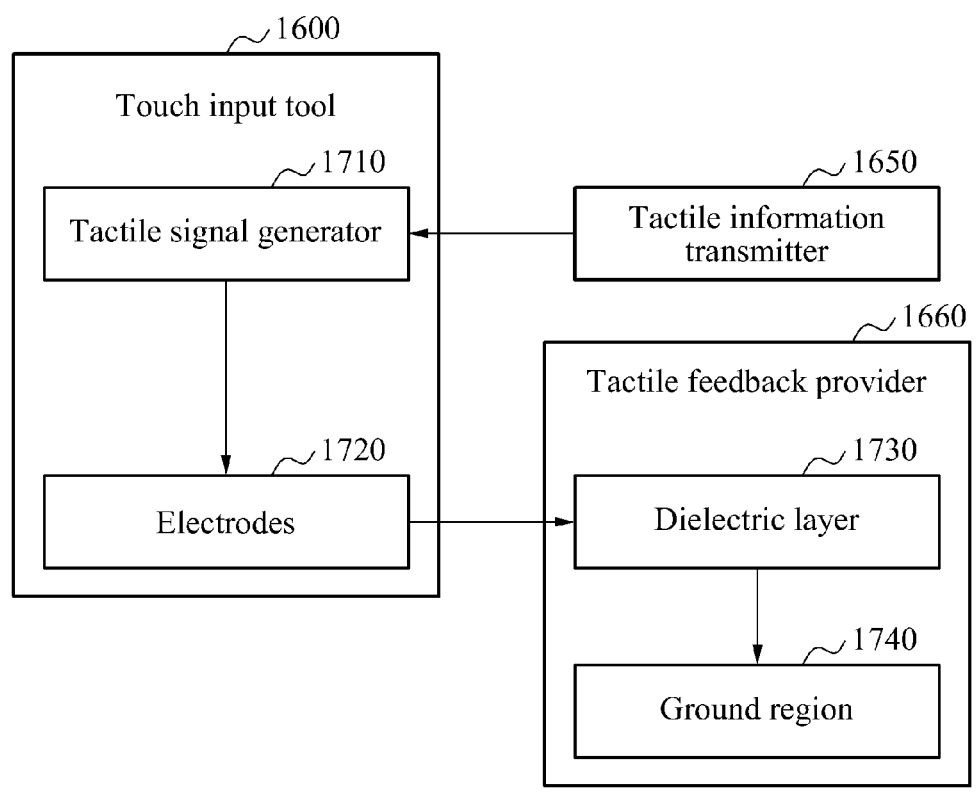
FIG. 17 illustrates operations performed between components of the tactile feedback apparatus of FIG. 16.

FIG. 17 illustrates operations performed between the tactile information transmitter 1650, the tactile feedback provider 1660, and the touch input tool 1600 of FIG. 16.

The tactile information transmitter 1650 may transmit the tactile information changed by the tactile information changing unit 1640 to a tactile signal generator 1710 of the touch input tool 1600 as shown in FIG. 16.

The tactile signal generator 1710 may generate a tactile signal, that is, driving voltage of electrodes 1720 of the touch input tool 1600 based on the received tactile information. Additionally, the tactile signal generator 1710 may transfer the generated tactile signal to the electrodes 1720.

The electrodes 1720 may be bonded to a region of the touch input tool 1600 that is to be touched by the touch input tool 1600. Additionally, the electrodes 1720 may apply an electric charge to a dielectric layer 1730 formed on the touch display 1610 based on the tactile signal output by the tactile signal generator 1710. The electrodes 1720 may generate an electrostatic force that provides a user holding the touch input tool 1600 with tactile feedback, by applying the electric charge to the dielectric layer 1730. Additionally, the electrodes 1720 may change the electric charge applied to the dielectric layer 1730, based on a frequency, an amplitude, or an input duration of the tactile signal, and may change the electrostatic force. Additionally, due to a change in the electrostatic force, the tactile feedback provided to the user holding the touch input tool 1600, or a frictional force between the dielectric layer 1730 and the touch input tool 1600, may be changed through the touch input tool 1600.

The tactile feedback provider 1660 may include the dielectric layer 1730 and a ground region 1740, as shown in FIG. 17.

The dielectric layer 1730 may be formed on the touch display 1610 and the ground region 1740, and the touch input tool 1600 may be in contact with the dielectric layer 1730. The dielectric layer 1730 may be formed of one of a compound with a high permittivity and an organic material with a high permittivity. Materials used in dielectric layers may have, for example, permittivity greater than or equal to 10.

The ground region 1740 may be disposed on the touch display 1610. The ground region 1740 may ground and discharge the electric charge applied to the dielectric layer 1730 by the electrodes 1720. When the ground region 1740 grounds and discharges the electric charge applied to the dielectric layer 1730, the electrodes 1720 may re-apply an electric charge to the dielectric layer 1730, so that an electrostatic force that provides a user with tactile feedback may be generated.

Figure 18:
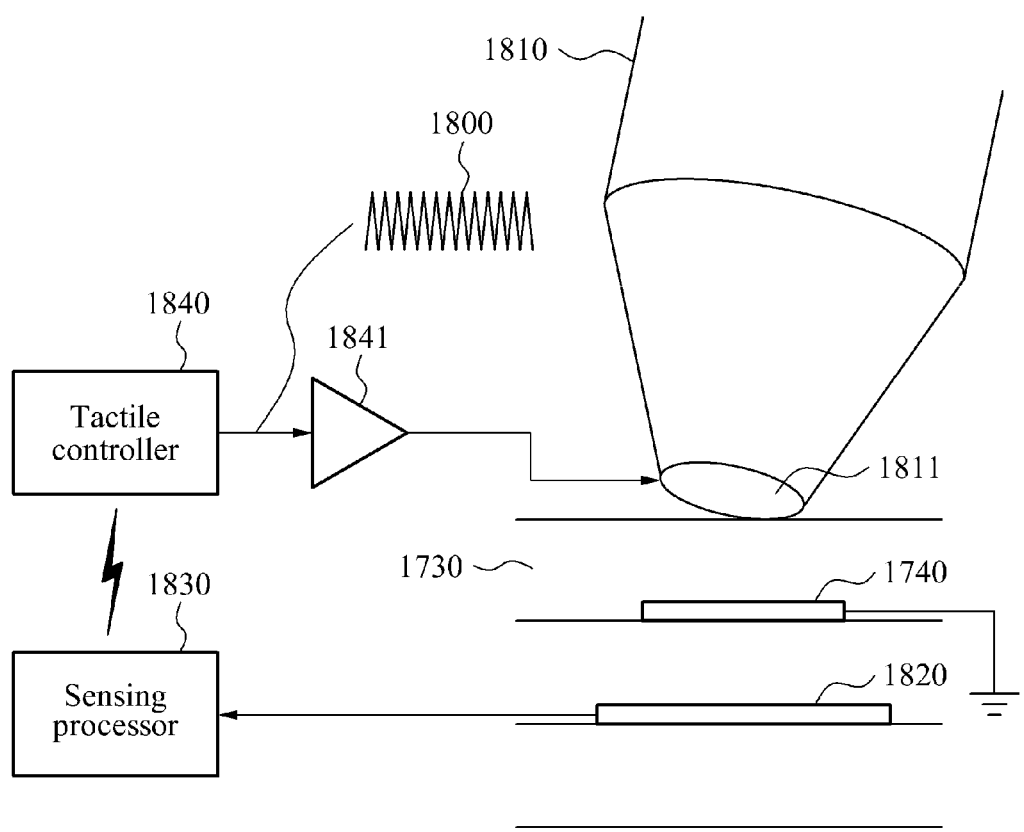
FIG. 18 illustrates an operation of the tactile feedback apparatus of FIG. 16.

FIG. 18 illustrates an operation of the tactile feedback apparatus 100 of FIG. 16.

In FIG. 18, when a pen 1810 including an electrode 1811 is used as a touch input tool, an electrostatic force may be generated between the electrode 1811 and the ground region 1740 and, accordingly, a frictional force may be generated between the pen 1810 and the dielectric layer 1730.

When the pen 1810 is in contact with the dielectric layer 1730, a sensor 1820 may sense contact by the pen 1810, and may generate sensing information. Additionally, the sensor 1820 may transfer the generated sensing information to a sensing processor 1830. The sensing processor 1830 may be, for example, hardware including the tactile information extractor 1630, the tactile information changing unit 1640, and the tactile feedback transmitter 1650 of FIG. 16.

The sensing processor 1830 may extract tactile information based on the sensing information and a texture of an object displayed by the touch display 1610 in a position in which the pen 1810 is in contact with the dielectric layer 1730, and may change the extracted tactile information. Additionally, the sensing processor 1830 may transmit the changed tactile information to a tactile controller 1840. The tactile controller 1840 may include the tactile signal generator 1710. The tactile controller 1840 may be included in the pen 1810 or may be separate hardware connected to the pen 1810. For example, the sensing processor 1830 may transmit the tactile information to the tactile controller 1840 via wireless communication, or may be connected via a cable to the tactile controller 1840, and may transmit the tactile information to the tactile controller 1840 via the cable.

The tactile controller 1840 may generate a tactile signal 1800 to operate the electrode 1811 based on the received tactile information, and may output the tactile signal 1800. A tactile signal amplifier 1841 may amplify the tactile signal 1800 output by the tactile controller 1840, and may transfer the amplified tactile signal 1800 to the electrode 1811 of the pen 1810.

The electrode 1811 may apply an electric charge to the dielectric layer 1730 based on the tactile signal 1800. The electric charge applied to the dielectric layer 1730 may cause a voltage difference between the electrode 1811 and the ground region 1740 of the tactile feedback provider 1660. Accordingly, an electrostatic force may be generated between the electrode 1811 and the ground region 1740 to close a distance between the electrode 1811 and the ground region 1740. When a user moves the pen 1810, a frictional force with a magnitude of "$\mu \times F_r$" may be generated by the generated electrostatic force and a frictional coefficient $\mu$ between the pen 1810 and the dielectric layer 1730. Additionally, the tactile controller 1840 may modulate the tactile signal 1800 based on at least one of a DC offset, a voltage amplitude, a voltage frequency combination, or a voltage duration of the tactile information, and may change the frictional force and tactile feedback based on the electrostatic force.

The ground region 1740 may ground and discharge the electric charge applied by the electrode 1811 to the dielectric layer 1730. When the ground region 1740 grounds and discharges the electric charge applied to the dielectric layer 1730, the electrodes 1720 may re-apply an electric charge to the dielectric layer 1730 so that an electrostatic force that provides a user with tactile feedback may be generated.

Figure 19A:
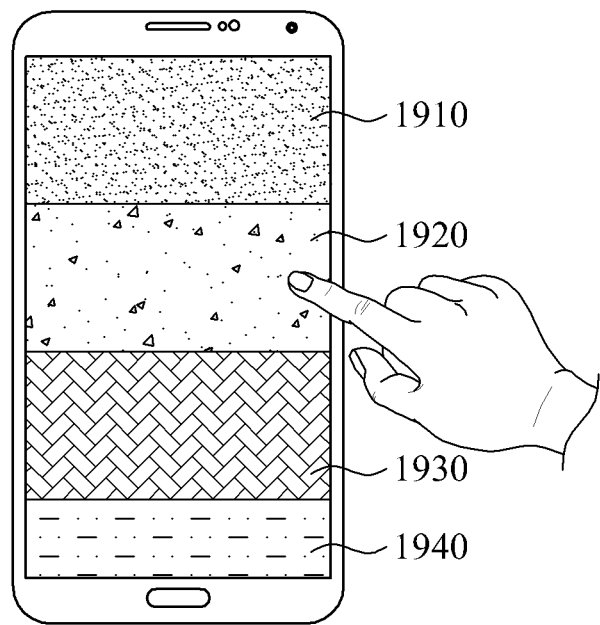
FIGS. 19A and 19B illustrate examples in which a tactile feedback apparatus provides a user with a texture based on a contact position according to some example embodiments.
Figure 19B:
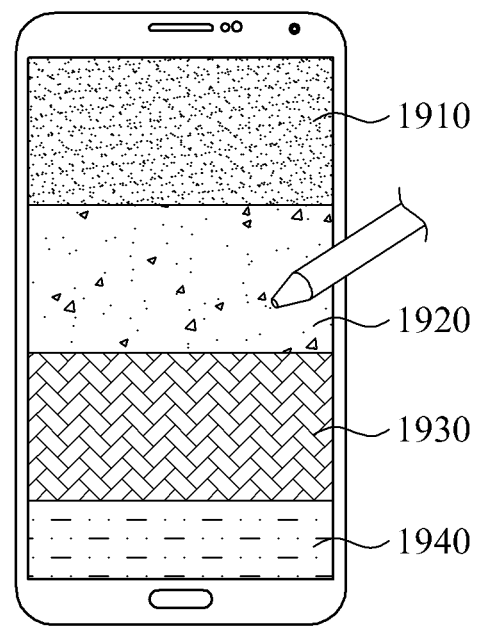

FIGS. 19A and 19B illustrate an example in which a tactile feedback apparatus provides a user with a texture based on a contact position according to some example embodiments.

Referring to FIGS. 19A and 19B, when a touch display displays objects with different textures, the tactile feedback apparatus 100 may provide tactile feedback to a touch input tool based on a texture of an object touched by the touch input tool.

In some example embodiments if a finger of a user is used as a touch input tool, the tactile feedback apparatus 100 may provide the finger with different tactile feedback every time the finger touches sand 1910, gravel 1920, a floor covering 1930, or grass 1940, as shown in FIG. 19A.

When the finger touches the sand 1910, the tactile feedback apparatus 100 may extract tactile information based on a texture of the sand 1910, and may control, based on the extracted tactile information, a frequency, an amplitude, or an input duration of a tactile signal input to an electrode of a region on which the sand 1910 is displayed and, accordingly, the user may be provided with a sense of touching the sand 1910 as tactile feedback. When the finger touches the gravel 1920, the tactile feedback apparatus 100 may extract tactile information based on a texture of the gravel 1920, and may control, based on the extracted tactile information, a frequency, an amplitude, or an input duration of a tactile signal input to an electrode of a region on which the gravel 1920 is displayed and, accordingly, the user may be provided with a sense of touching the gravel 1920 as tactile feedback. When the finger touches the floor covering 1930, the tactile feedback apparatus 100 may extract tactile information based on a texture of the floor covering 1930, and may control, based on the extracted tactile information, a frequency, an amplitude, or an input duration of a tactile signal input to an electrode of a region on which the floor covering 1930 is displayed and, accordingly, the user may be provided with a sense of touching the floor covering 1930 as tactile feedback. Additionally, when the finger touches the grass 1940, the tactile feedback apparatus 100 may extract tactile information based on a texture of the grass 1940, and may control, based on the extracted tactile information, a frequency, an amplitude, or an input duration of a tactile signal input to an electrode of a region on which the grass 1940 is displayed and, accordingly, the user may be provided with a sense of touching the floor covering 1930 as tactile feedback.

In some example embodiments, if a pen is used as a touch input tool, the tactile feedback apparatus 100 may provide the pen with different tactile feedback every time the pen touches the sand 1910, the gravel 1920, the floor covering 1930, or the grass 1940, as shown in FIG. 19B. In some example embodiments, the tactile feedback apparatus 100 may operate as described above with reference to FIG. 19A, and a user may be provided through a hand holding the pen with a sense of moving the pen in the sand 1910, the gravel 1920, the floor covering 1930, or the grass 1940.

Therefore, the tactile feedback apparatus 100 may provide different tactile feedback to the touch input tool for each of textures of objects touched by the touch input tool. Thus, a user using the touch input tool may experience a sense of really touching a corresponding object, or a sense of moving a writing instrument on the corresponding object.

Figure 20:
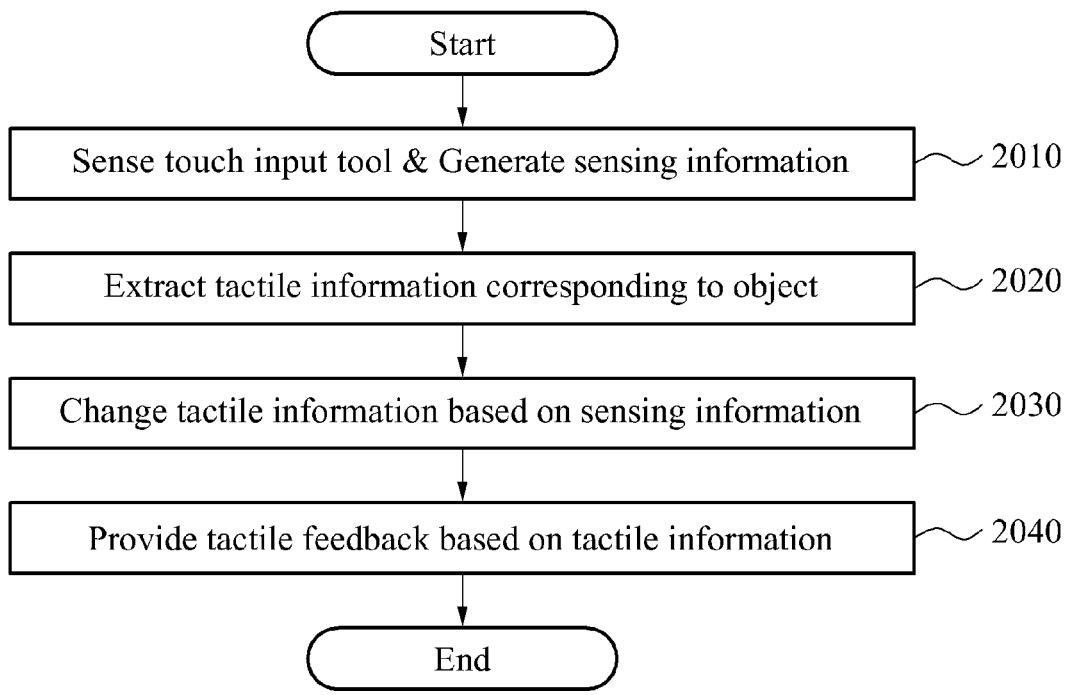
FIG. 20 is a flowchart illustrating a tactile feedback method according to some example embodiments.

FIG. 20 illustrates a tactile feedback method according to some example embodiments.

Referring to FIG. 20, in operation 2010, the sensor 120 may sense a touch input tool used to touch an object displayed by the touch display 110, and may generate sensing information. For example, the sensor 120 may sense at least one of a position of the touch input tool, an area of the touch input tool, a moving speed of the touch input tool, or pressure applied to the object by the touch input tool, and may generate sensing information based on a result of the sensing.

In operation 2020, the tactile information extractor 130 may identify an object touched by the touch input tool based on the sensing information generated in operation 2010, and may extract tactile information corresponding to the identified object. For example, the tactile information extractor 130 may identify the object touched by the touch input tool based on the position of the touch input tool in the sensing information. Additionally, the tactile information extractor 130 may identify a type of the touch input tool based on the area of the touch input tool. Furthermore, the tactile information extractor 130 may receive an input of an input mode selected by a user. The tactile information extractor 130 may extract, from a database, tactile information corresponding to at least one of the type of the touch input tool, the input mode, and a texture of an object.

In operation 2030, the tactile information changing unit 140 may change the tactile information extracted in operation 2020, based on the sensing information generated in operation 2010. The tactile information changing unit 140 may change the tactile information based on at least one of the moving speed, the area and the pressure.

In operation 2040, the tactile feedback provider 150 may provide the touch input tool with tactile feedback based on the tactile information changed in operation 2030. For example, the tactile feedback provider 150 may generate a tactile signal to operate an electrode based on the tactile information changed in operation 2030, and may transfer the tactile signal to the electrode. The electrode may generate an electrostatic force by applying an electric charge to a dielectric layer based on the tactile signal. The generated electrostatic force may be used to provide tactile feedback to the touch input tool, or to change a frictional force between the touch display 110 and the touch input tool.

The method of FIG. 20 may be used in more general purpose apparatuses and/or methods of controlling apparatuses. For example, the method may be used in various apparatuses for displaying images to multiple viewers, for controlling such apparatuses so as to allow viewing by multiple viewers, and/or for controlling such apparatuses so as to allow operation by multiple users.

The methods described above may be written as computer programs and can be implemented in general-use digital computers that execute the programs using a computer-readable recording medium. In addition, a structure of data used in the methods may be recorded in a computer-readable recording medium in various ways. Examples of the computer-readable recording medium include storage media such as magnetic storage media (e.g., ROM (Read-Only Memory), RAM (Random-Access Memory), USB (Universal Serial Bus), floppy disks, hard disks, etc.) and optical recording media (e.g., CD-ROMs (Compact Disc Read-Only Memories) or DVDs (Digital Video Discs)).

In addition, some example embodiments may also be implemented through computer-readable code/instructions in/on a medium (e.g., a computer-readable medium) to control at least one processing element to implement some example embodiments. The medium may correspond to any medium/media permitting the storage and/or transmission of the computer-readable code.

The computer-readable code may be recorded/transferred on a medium in a variety of ways, with examples of the medium including recording media, such as magnetic storage media (e.g., ROM, floppy disks, hard disks, etc.) and optical recording media (e.g., CD-ROMs or DVDs), and transmission media such as Internet transmission media. Thus, the medium may be such a defined and measurable structure including or carrying a signal or information, such as a device carrying a bitstream according to some example embodiments. The media may also be a distributed network, so that the computer-readable code is stored/transferred and executed in a distributed fashion. Furthermore, the processing element could include a processor or a computer processor, and processing elements may be distributed and/or included in a single device.

In some example embodiments, some of the elements may be implemented as a 'module'. According to some example embodiments, 'module' may be interpreted as software-based components or hardware components, such as a field programmable gate array (FPGA) or an application specific integrated circuit (ASIC), and the module may perform certain functions. However, the module is not limited to software or hardware. The module may be configured so as to be placed in a storage medium which may perform addressing, or to execute one or more processors.

For example, modules may include components such as software components, object-oriented software components, class components, and task components, processes, functions, attributes, procedures, subroutines, segments of program code, drivers, firmware, microcodes, circuits, data, databases, data structures, tables, arrays, and variables. Functions provided from the components and the modules may be combined into a smaller number of components and modules, or be separated into additional components and modules. Moreover, the components and the modules may execute one or more central processing units (CPUs) in a device.

Some example embodiments may be implemented through a medium including computer-readable codes/instructions to control at least one processing element of the above-described embodiment, for example, a computer-readable medium. Such a medium may correspond to a medium/media that may store and/or transmit the computer-readable codes.

The computer-readable codes may be recorded in a medium or be transmitted over the Internet. For example, the medium may include a ROM, a RAM, a CD-ROM, a magnetic tape, a floppy disc, an optical recording medium, or a carrier wave such as data transmission over the Internet. Further, the medium may be a non-transitory computer-readable medium. Since the medium may be a distributed network, the computer-readable code may be stored, transmitted, and executed in a distributed manner. Further, for example, the processing element may include a processor or a computer processor, and be distributed and/or included in one device.

Although some example embodiments have been shown and described, it would be appreciated by those skilled in the art that changes may be made in these example embodiments without departing from the principles and spirit of the example embodiments, the scope of which is defined in the claims and their equivalents. For example, while certain operations have been described as being performed by a given element, those skilled in the art will appreciate that the operations may be divided between elements in various manners.

Although some example embodiments are described above with relation to tactile feedback apparatuses and methods for providing sensations of writing, those skilled in the art will appreciate that some example embodiments may be applied to other types of apparatuses and methods, such as apparatuses and methods not used in the medical field (e.g., aerospace teleoperation systems, apparatuses for handling hazardous materials, patrol apparatuses, military apparatuses), humanoid apparatuses, or more general purpose apparatuses and methods. Those skilled in the art will appreciate that the tactile feedback apparatuses and methods for providing sensations of writing described in this application have a myriad of practical uses.

Although some example embodiments have been shown and described, it would be appreciated by those skilled in the art that changes may be made to these example embodiments without departing from the principles and spirit of the invention, the scope of which is defined by the claims and their equivalents.

It should be understood that the example embodiments described herein should be considered in a descriptive sense only and not for purposes of limitation. Descriptions of features or aspects within each embodiment should typically be considered as available for other similar features or aspects in other embodiments.

What is claimed is:

1. A tactile feedback apparatus, comprising:
a touch display configured to display objects; and
a processor configured to,
identify a type of touch input tool,
extract tactile information corresponding to the identified touch input tool and an object touched by the identified touch input tool,
change the tactile information based on sensing information of the identified touch input tool, and
provide the identified touch input tool with tactile feedback based on the changed tactile information.

2. The tactile feedback apparatus of claim 1, wherein the processor is configured to further extract the tactile information based on a texture of the object.

3. The tactile feedback apparatus of claim 2, wherein if the identified touch input tool is a pen, the processor is configured to change an amplitude of the tactile information based on the texture of the object such that a user has a sensation of writing on the object using the pen.

4. The tactile feedback apparatus of claim 1, wherein the processor is configured to further extract the tactile information based on a texture of the object and a type of an input mode in which an input by the identified touch input tool is recognized in a form of a pen or a brush with a desired thickness.

5. The tactile feedback apparatus of claim 4, wherein the processor is configured to change an amplitude of the tactile information based on the texture of the object and the type of the input mode such that a user has a sensation of writing on the object, using the pen or the brush with the desired thickness, in the input mode.

6. The tactile feedback apparatus of claim 1, wherein the sensing information includes at least one of a position of the identified touch input tool, an area of the identified touch input tool in contact with the touch display, a moving speed of the identified touch input tool, and a pressure applied to the object by the identified touch input tool.

7. The tactile feedback apparatus of claim 6, wherein the processor is configured to change an amplitude of the tactile information based on the area of the identified touch input tool in contact with the touch display.

8. The tactile feedback apparatus of claim 6, wherein the processor is configured to change a frequency of the tactile information based on the moving speed of the identified touch input tool.

9. The tactile feedback apparatus of claim 6, wherein the processor is configured to change an amplitude of the tactile information based on the pressure applied to the object by the identified touch input tool.

10. The tactile feedback apparatus of claim 1, wherein the identified touch input tool is a user's finger or a pen configured to enable a touch input.

11. A tactile feedback apparatus, comprising:
a touch display configured to display objects; and
a processor configured to,
identify a type of touch input tool,
extract tactile information corresponding to the identified touch input tool and an object touched by the identified touch input tool,
change the tactile information based on sensing information of the identified touch input tool,
transmit the tactile information to the identified touch input tool, and
provide the identified touch input tool with tactile feedback based on the changed tactile information by generating an electrostatic force based on a voltage difference between a ground region and an electrode, the ground region being associated with a first one of the touch display and the identified touch input tool, and the electrode being associated with a second one of the touch display and the identified touch input tool, the electrode configured to operate based on the changed tactile information.

12. The tactile feedback apparatus of claim 11, wherein the identified touch input tool is configured to operate the electrode using a tactile signal corresponding to the changed tactile information, and is configured to apply an electric charge to the object.

13. The tactile feedback apparatus of claim 11, wherein the processor is configured to further extract the tactile information based on a texture of the object.

14. The tactile feedback apparatus of claim 13, wherein the processor is configured to change an amplitude of the tactile information based on the texture of the object such that a user holds the identified touch input tool with a sensation of writing on the object using a pen.

15. The tactile feedback apparatus of claim 11, wherein the processor is configured to further extract the tactile information based on a texture of the object and a type of an input mode in which an input by the identified touch input tool is recognized in a form of a pen or a brush with a desired thickness.

16. The tactile feedback apparatus of claim 15, wherein the processor is configured to change an amplitude of the tactile information based on the texture of the object and the type of the input mode such that a user holds the identified touch input tool with a sensation of writing on the object, using the pen or the brush with the desired thickness, in the input mode.

17. The tactile feedback apparatus of claim 11, wherein the sensing information includes at least one of a position of the identified touch input tool, an area of the identified touch input tool in contact with the touch display, a moving speed of the identified touch input tool, and a pressure applied to the object by the identified touch input tool.

18. The tactile feedback apparatus of claim 17, wherein the processor is configured to change an amplitude of the tactile information based on the area of the identified touch input tool in contact with the touch display.

19. The tactile feedback apparatus of claim 17, wherein the processor is configured to change a frequency of the tactile information based on the moving speed of the identified touch input tool.

20. A tactile feedback method, comprising:
    identifying a type of touch input tool;
    extracting tactile information corresponding to the identified touch input tool and an object touched by the identified touch input tool;
    changing the tactile information based on sensing information of the identified touch input tool; and
    providing the identified touch input tool with tactile feedback based on the changed tactile information.

* * * * *